(12) United States Patent
Sivaraman et al.

(10) Patent No.: US 12,462,586 B2
(45) Date of Patent: *Nov. 4, 2025

(54) OCCUPANT EVALUATION USING MULTI-MODAL SENSOR FUSION FOR IN-CABIN MONITORING SYSTEMS AND APPLICATIONS

(71) Applicant: NVIDIA Corporation, Santa Clara, CA (US)

(72) Inventors: Sakthivel Sivaraman, Sunnyvale, CA (US); Rajath Shetty, Sunnyvale, CA (US); Hairong Jiang, Campbell, CA (US); Arjun Guru, Mountain View, CA (US); Yuzhuo Ren, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 18/349,827

(22) Filed: Jul. 10, 2023

(65) Prior Publication Data

US 2025/0022289 A1    Jan. 16, 2025

(51) Int. Cl.
  *G06V 20/59* (2022.01)
  *G06T 7/50* (2017.01)
  *G06V 40/10* (2022.01)

(52) U.S. Cl.
  CPC ............. *G06V 20/59* (2022.01); *G06T 7/50* (2017.01); *G06V 40/10* (2022.01); *G06T 2207/30268* (2013.01)

(58) Field of Classification Search
  CPC ............ G06T 2207/30268; G06T 7/50; G06V 10/803; G06V 10/806; G06V 20/59;
  (Continued)

(56) References Cited

U.S. PATENT DOCUMENTS 10,140,533 B1   11/2018   Chan et al.
10,147,007 B1   12/2018   Chan et al.
(Continued)

FOREIGN PATENT DOCUMENTS

WO   2020/205597 A1   10/2020

OTHER PUBLICATIONS

Esfahani et al., "A Survey of State-of-the-art Gan-based Approaches to Image Synthesis", Department of Computer Science, Jul. 13, 2019, pp. 63-76.
(Continued)

*Primary Examiner* — Manuchehr Rahmjoo
(74) *Attorney, Agent, or Firm* — Shook, Hardy & Bacon L.L.P.

(57) ABSTRACT

In various examples, occupant assessment using multi-modal sensor fusion for monitoring systems and applications are provided. In some embodiments, an occupant monitoring system comprises an occupant evaluation function that may predict at least one characteristic representative of a size of the occupant. The occupant evaluation function may include a first processing path that generates a representation of features corresponding to the occupant based on optical image data, and a second processing path that performs operations to determine a depth corresponding to the one or more features based on depth data derived from the optical image data and the point cloud depth data. In some embodiments, a three-dimensional pose detection model generates a three-dimensional pose estimate of the occupant using the optical image data, and the three-dimensional pose estimate is scaled to an absolute pose based on the point cloud depth data.

14 Claims, 13 Drawing Sheets

(58) Field of Classification Search
CPC .... G06V 20/593; G06V 20/647; G06V 40/10; G06V 40/103
See application file for complete search history.

(56) References Cited

U.S. PATENT DOCUMENTS

| | | | |
|---|---|---|---|
| 10,885,698 | B2 | 1/2021 | Muthler et al. |
| 10,967,824 | B1 | 4/2021 | Pertsel et al. |
| 11,144,754 | B2 | 10/2021 | Hu et al. |
| 11,270,425 | B2 | 3/2022 | Liao et al. |
| 11,348,279 | B1 | 5/2022 | Akbas et al. |
| 11,713,600 | B1 | 8/2023 | Weng |
| 2003/0209893 | A1 | 11/2003 | Breed et al. |
| 2006/0208169 | A1 | 9/2006 | Breed et al. |
| 2017/0200082 | A1 | 7/2017 | Böhm |
| 2019/0236809 | A1 | 8/2019 | Graziosi |
| 2019/0378294 | A1 | 12/2019 | Zhang et al. |
| 2020/0342270 | A1 | 10/2020 | Biswas et al. |
| 2021/0052176 | A1 | 2/2021 | Sarely et al. |
| 2021/0105619 | A1 | 4/2021 | Kashani et al. |
| 2021/0150726 | A1 | 5/2021 | Kao et al. |
| 2021/0182609 | A1 | 6/2021 | Arar et al. |
| 2021/0248772 | A1 | 8/2021 | Iqbal et al. |
| 2021/0276511 | A1 | 9/2021 | Galan-Oliveras et al. |
| 2022/0067410 | A1 | 3/2022 | Raz et al. |
| 2022/0292705 | A1 | 9/2022 | Friedman et al. |
| 2022/0300072 | A1 | 9/2022 | Arar et al. |
| 2022/0379831 | A1 | 12/2022 | Nakamura et al. |
| 2022/0388527 | A1 | 12/2022 | Barth et al. |
| 2023/0168364 | A1* | 6/2023 | Podkamien ........... G01S 13/582 701/45 |
| 2023/0326051 | A1 | 10/2023 | Jung et al. |
| 2023/0342902 | A1 | 10/2023 | Manafiazar et al. |
| 2024/0071106 | A1 | 2/2024 | Kito et al. |
| 2024/0104879 | A1 | 3/2024 | Jiang et al. |
| 2024/0104941 | A1 | 3/2024 | Ren et al. |
| 2024/0199062 | A1 | 6/2024 | Park |
| 2024/0290112 | A1 | 8/2024 | Hempel et al. |
| 2024/0308456 | A1 | 9/2024 | Ghannam et al. |
| 2024/0354980 | A1 | 10/2024 | Rehfeld et al. |
| 2024/0404166 | A1 | 12/2024 | Liu |
| 2024/0404260 | A1 | 12/2024 | Lin et al. |
| 2024/0412452 | A1 | 12/2024 | Zheng et al. |
| 2025/0022155 | A1 | 1/2025 | Sivaraman et al. |
| 2025/0022290 | A1 | 1/2025 | Sivaraman et al. |

OTHER PUBLICATIONS

International Search Report and Written Opinion received for PCT Patent Application No. PCT/US2024/036754, mailed on Oct. 25, 2024, 14 pages.
International Search Report and Written Opinion received for PCT Patent Application No. PCT/US2024/036762, mailed on Oct. 14, 2024, 14 pages.
Kuchar et al., "Passenger Occupancy Estimation in Vehicles: A Review of Current Methods and Research Challenges", Sustainability, vol. 15, No. 2, 2023, pp. 1-27.
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Domhof, J., et al., "An Extrinsic Calibration Tool for Radar, Camera and Lidar", International Conference on Robotics and Automation (ICRA), pp. 7 (2019).
U.S. Appl. No. 17/935,473, filed Sep. 26, 2022, titled "Multi-Modal Sensor Calibration for In-Cabin Monitoring Systems and Applications".
U.S. Appl. No. 17/935,465, filed Sep. 26, 2022, titled "Sensor Calibration Using Fiducial Markers for In-Cabin Monitoring Systems and Applications".
Otto, M., M., et al., "Presenting a Holistic Framework for Scalable, Marker-less Motion Capturing: Skeletal Tracking Performance Analysis, Sensor Fusion Algorithms and Usage in Automotive Industry", Journal of Virtual Reality and Broadcasting, vol. 13, No. 3, pp. 1-16 (2016).
"Kinect", Wikipedia, Retrieved from Internet URL : https://en.wikipedia.org/wiki/Kinect, accessed on Mar. 22, 2023, pp. 28.
International Search Report and Written Opinion received for PCT Patent Application No. PCT/US2024/036758, mailed on Oct. 31, 2024, 14 pages.
Moussa, M.M.; Shoitan, R.; Cho, Y.-I.; Abdallah, M.S. Visual-Based Children and Pet Rescue from Suffocation and Incidence of Hyperthermia Death in Enclosed Vehicles. Sensors 2023, 23, 7025. https://doi.org/10.3390/s23167025. (Year: 2023).
Non-Final Office Action received for U.S. Appl. No. 18/219,969, mailed on Jul. 11, 2025, 14 pages.
Non-Final Office Action received for U.S. Appl. No. 18/349,842, mailed on Jun. 30, 2025, 13 pages.
Non-Final Office Action received for U.S. Appl. No. 18/349,853, mailed on Jul. 11, 2025, 15 pages.
X. Zeng, B. Wang, C. Wu, S. D. Regani and K. J. R. Liu, "WiCPD: Wireless Child Presence Detection System for Smart Cars," in IEEE Internet of Things Journal, vol. 9, No. 24, pp. 24866-24881, 15 Dec. 15, 2022, doi: 10.1109/JIOT.2022.3194873. (Year: 2022).

* cited by examiner

OCCUPANT EVALUATION USING MULTI-MODAL SENSOR FUSION FOR IN-CABIN MONITORING SYSTEMS AND APPLICATIONS

CROSS-REFERENCE TO RELATED APPLICATIONS

This application is related to U.S. patent application Ser. No. 17/935,473, filed on Sep. 26, 2022, titled "MULTI-MODAL SENSOR CALIBRATION FOR IN-CABIN MONITORING SYSTEMS AND APPLICATIONS", and U.S. patent application Ser. No. 17/935,465, filed on Sep. 26, 2022, titled "SENSOR CALIBRATION USING FIDUCIAL MARKERS FOR IN-CABIN MONITORING SYSTEMS AND APPLICATIONS", which are each incorporated herein by reference in its entirety.

This application is related to U.S. patent application Ser. No. 18/349,842, filed on Jul. 10, 2023, titled "THREE-DIMENSIONAL POSE ESTIMATION USING TWO-DIMENSIONAL IMAGES", U.S. patent application Ser. No. 18/349,853, filed on Jul. 10, 2023, titled "IMAGE-BASED THREE-DIMENSIONAL OCCUPANT ASSESSMENT FOR IN-CABIN MONITORING SYSTEMS AND APPLICATIONS", and U.S. patent application Ser. No. 18/219,969, filed on Jul. 10, 2023, titled "CHILD PRESENCE DETECTION FOR IN-CABIN MONITORING SYSTEMS AND APPLICATIONS", which are each incorporated herein by reference in its entirety.

BACKGROUND

An occupant monitoring system (OMS) may be used within a vehicle cabin to perform real-time assessments of driver and occupant presence, gaze, alertness, or other conditions. For example, an OMS—using data generated or obtained by sensors of the vehicle or machine—may be used to track the direction of a driver's eye gaze, head pose, or blinking (for example to detect drowsiness, fatigue, and/or distraction), for hand position and/or gesture detection, child and/or pet presence detection, and/or in conjunction with the operation of features such as, but not limited to, seat belt reminders, seat heating and/or smart airbag deployment. For example, optical sensors may be used to detect motion occurring within a vehicle interior. Optical image sensor data may also be processed to extract image features to identify and classify the source of motion. Depth-perception sensors may use radio waves, laser light, and/or sound waves, for example, to detect the presence or movements of living beings within a vehicle interior (e.g., humans or pets). Such detections may be used within the context of preventing vehicle burglary and/or preventing children or pets from being left alone in the vehicle unintentionally.

SUMMARY

Embodiments of the present disclosure relate to three-dimensional occupant evaluation using multi-modal sensor fusion. Systems and methods are disclosed that predict a 3-dimentional (3D) pose estimate, and/or a 3D size estimate, of a vehicle occupant.

In contrast to existing OMS technologies, the occupant evaluation function presented in this disclosure provides, among other things, for an occupant monitoring system that may determine a 3D representation of a vehicle occupant (such as their 3D size, 3D shape and/or 3D pose) using multi-modal sensor inputs, such as a combination of OMS sensor data from an optical image sensor (e.g., an in-cabin overhead console fisheye or wide angle camera) and a point cloud generating depth sensor (e.g., a RADAR sensor and/or a LIDAR sensor). The 3D representation of the occupant may include at least one characteristic representative of a size of the occupant (e.g., a 3D pose and/or a 3D size estimate) based at least on the representation of the one or more features and the depth corresponding to the one or more features as determined using the point cloud.

In some embodiments, the OMS comprises an occupant evaluation function that may predict a scale-normalized 3D pose estimate corresponding to a vehicle occupant, and then scale that 3D pose estimate into full-scale dimensions of linear measurement (e.g., inches or meters) based on the point cloud depth data to determine at least one characteristic representing a size of the occupant. The occupant evaluation function may execute a first processing path that performs operations to generate a representation of one or more features corresponding to at least a portion of the occupant based on optical image data (e.g., an image frame), and a second processing path that performs operations to determine a depth corresponding to the one or more features based on depth data derived from the optical image data and the point cloud depth data. In general, the depth information derived from the second processing path may be used by the occupant evaluation function to provide a sense of absolute scale for generating a true-to-scale 3D representation of a vehicle occupant from the representation of the vehicle occupant generated by the first processing path of the occupant evaluation function.

In some embodiments, the occupant evaluation function processes an input optical image frame from an OMS optical image sensor to derive a scale-normalized 3D pose estimate corresponding to at least a portion of the occupant. For example, in some embodiments, the first processing path of the occupant evaluation function may include a person detection model and a 3D pose detection model. An optical image frame may be processed by the person detection model, which may recognize features of the occupant and crop the image frame to produce a cropped image (e.g., an image bounded by an outline of the occupant). Based on the cropped image, the 3D pose detection model may generate a scale-normalized 3D pose of the occupant. The scale-normalized 3D pose may comprise a 3D representation of kinematic elements (e.g., body limbs and/or joints) that indicates 3D coordinates for the kinematic elements. The 3D pose detection model may be trained based on synchronized multi-view images of training subjects, and/or supervised training using single views, to produce 3D pose estimates using coordinates that are scale-normalized. That is, the 3D coordinates are scale-normalized in that they may indicate the dimensions and/or relative positions of kinematic elements in relation to each other, rather than in absolute terms (e.g., linear measurement units). To map the scale-normalized 3D pose of the occupant to an absolute 3D pose, the second processing path of the occupant evaluation function determines an absolute 3D depth corresponding to at least one joint from the scale-normalized 3D pose using the depth data from the point cloud depth sensor. Using the at least one joint to anchor the scale-normalized 3D pose to an absolute scale, the occupant evaluation function may determine a set of absolute coordinates for the other kinematic elements of the scale-normalized 3D pose to derive an absolute 3D pose.

In some embodiments, an occupant evaluation function as disclosed herein may produce 3D pose estimates of a machine occupant(s) that may be used as inputs to other systems and functions that further predict other characteristics regarding the machine occupant(s) such as a size, weight, and/or age of the machine occupant(s). The occupant evaluation function may thus be used in conjunction with a child presence detection system designed to protect against children and/or pets from being left alone in a vehicle or other machine by accident.

BRIEF DESCRIPTION OF THE DRAWINGS

The present systems and methods for multi-modal sensor fusion based three-dimensional occupant assessment for in-cabin monitoring systems and applications are described in detail below with reference to the attached drawing figures, wherein.

DETAILED DESCRIPTION

Figure 1:
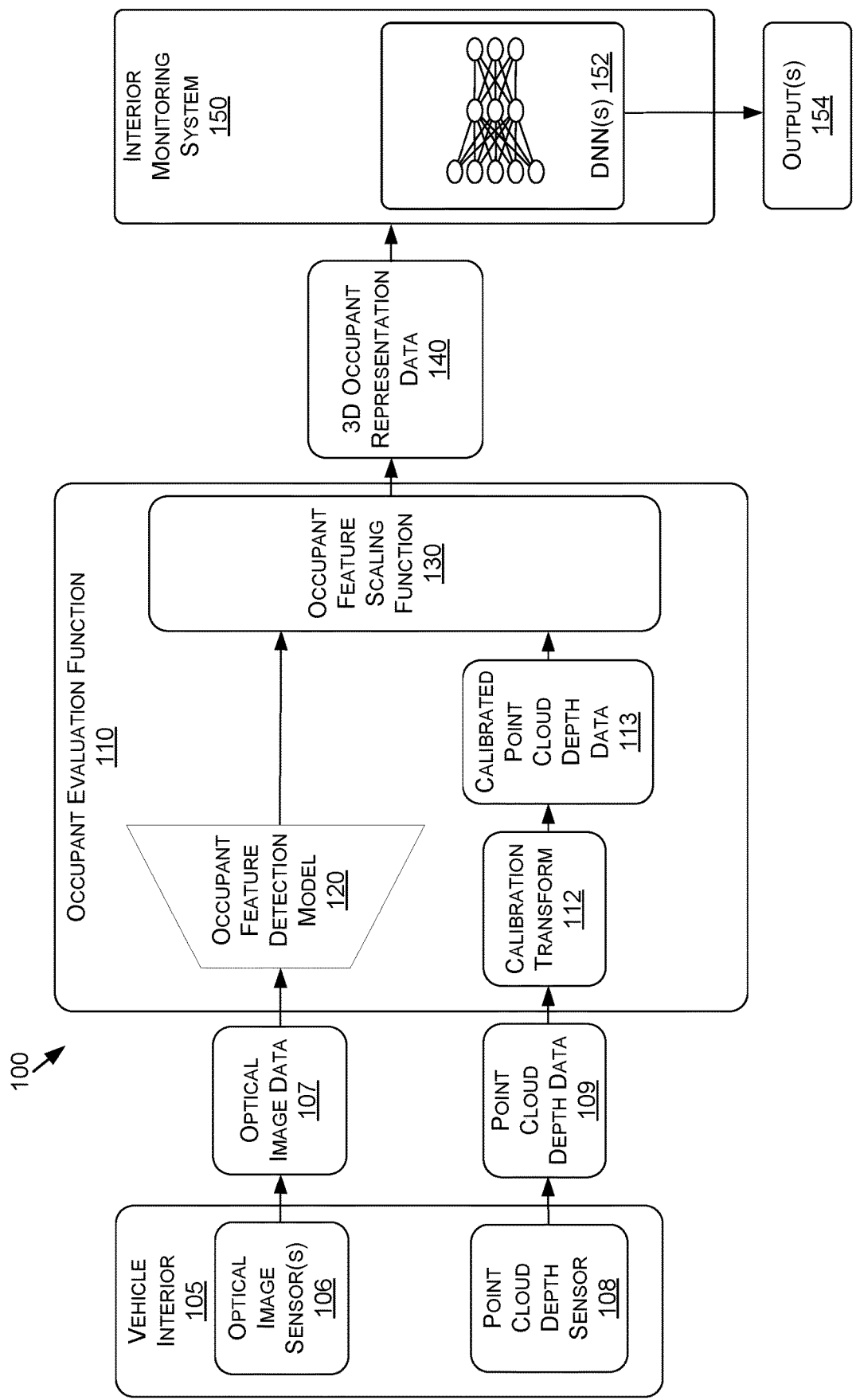
FIG. 1 is an example data flow diagram for a system for multi-modal sensor based three-dimensional occupant assessment, in accordance with some embodiments of the present disclosure.

Systems and methods are disclosed related to occupant evaluation using multi-modal sensor fusion. Although the present disclosure may be described with respect to an example autonomous or semi-autonomous vehicle or machine 800 (alternatively referred to herein as "vehicle 800" or "ego-machine 800," an example of which is described with respect to FIGS. 8A-8D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater crafts, remotely operated vehicles such as drones, and/or other vehicle types. In addition, although the present disclosure may be described with respect to image-based assessments of vehicle occupant characteristics (e.g., estimating occupant size and/or pose for vehicle occupant monitoring systems), this is not intended to be limiting, and the systems and methods described herein may be used in augmented reality, virtual reality, mixed reality, robotics, security and surveillance, autonomous or semi-autonomous machine applications, and/or any other technology spaces where characterizing physical characteristics of a person may be used.

The present disclosure relates to vehicle occupant detection and monitoring technologies. More specifically, the systems and methods presented in this disclosure provide for technologies for an occupant monitoring system (OMS) that may predict a 3-dimentional pose estimate of a vehicle occupant from an image frame captured by an optical image sensor (e.g., a camera). A size of the vehicle occupant may be derived based on the 3D pose estimate. Of the tasks that may be performed by an OMS, child presence detection (CPD) in particular involves, among other things, the task of detecting when a child is an occupant of a vehicle. For example, a child protection system may attempt to assess when an occupant of an idle vehicle is less than a threshold age, and alert the vehicle owner when a child may have been inadvertently left behind inside the vehicle. Size estimation may be an upstream task related to the age estimation task, since a person's size correlates heavily with age and is one of the most observable characteristics of a person that can be used in assessing the age of a vehicle occupant.

Particularly with respect to detecting the presence and/or three-dimensional (3D) body pose of a vehicle occupant, traditional systems have used in-cabin depth sensors, such as RADAR sensors, that may directly generate 3D data corresponding to detected objects in the vehicle cabin, and that may penetrate through structural elements of the vehicle interior (e.g., car seats) to detect occluded objects not within a line of sight of an optical image sensor. RADAR sensors may produce sensor data that can be used to derive size estimates generally representative of the size of an occupant (e.g., to differentiate a child from an adult occupant) in three dimensions. However, the sensor data from a RADAR is of limited resolution that limits its ability to produce 3D body pose estimates that precisely capture the position of body limbs (e.g., for child presence detection and/or occupant age predictions), and primarily rely on sensed motion to sense objects. Other depth-sensing sensors, such as depth-sensing cameras, also referred to as range cameras, produce a two-dimensional (2D) range image, where pixel values of the range image may correspond to a distance from the sensor to sensed object in the sensor's field of view. However, depth-sensing cameras can be expensive to deploy in production vehicles. Moreover, the accuracy of deriving 3D depth data for an occupant from 2D range images produced by a depth-sensing camera may be limited by factors such as relatively low resolution, short sensing distances, and susceptibility to occlusions and/or optical interference.

Optical image sensor data from monocular optical image sensors, such as a camera that captures standard RGB, IR, and/or RGB-IR image frames, may be obtained using relatively inexpensive devices that may already be deployed in the vehicle cabin for other purposes (e.g., driver gaze detection), but only provide 2D images that, by themselves, do not convey a sense of the 3D position of objects in the capture scene, which makes it difficult to train a machine learning model, such as a deep neural network (DNN), to generate accurate 3D size and/or 3D body pose estimates for people captured in the 2D images. Moreover, estimates based on 2D images are vulnerable to producing inaccurate estimates the more the occupant deviates from an upright posture, such as when the occupant is sitting in a slouched or hunched position and/or turned to one side, for example. This is often because 2D to 3D imaging mapping is an ill-posed problem with ambiguous solutions, for example where the same 2D projection may be derived from multiple 3D poses.

In contrast to a traditional OMS technologies as discussed above, the systems and methods presented in this disclosure provide for an occupant monitoring system that may determine a 3D representation of a vehicle occupant (such as their 3D size and/or 3D pose) using multi-modal sensor inputs, such as a combination of OMS sensor data from an optical image sensor (e.g., an in-cabin overhead fisheye or wide angle camera) and a point cloud generating depth sensor (e.g., a RADAR sensor and/or a LIDAR sensor). Such a point cloud generating depth sensor may be referred to herein as a point cloud depth sensor. The 3D representation of the occupant may include at least one characteristic representative of a size of the occupant (e.g., a 3D pose estimate) based at least on the representation of the one or more features and the depth corresponding to the one or more features as determined using the point cloud.

In some embodiments, an occupant evaluation function as disclosed herein may produce 3D pose estimates of a vehicle occupant that may be used as inputs to other systems and functions that further predict other characteristics regarding a vehicle occupant such as a size, weight, and/or age of the vehicle occupant. The occupant evaluation function may thus be used in conjunction with a child presence detection system designed to protect against children and/or pets from being left alone in a vehicle by accident. In some embodiments the occupant monitoring systems may be used in conjunction with other vehicle safety features. For example, in some embodiments, airbag deployments may be controlled based on a 3D pose and/or size estimate of a vehicle occupant. Based on the 3D pose and/or estimate, an airbag deployment system may determine that the vehicle occupant is out of position so that an airbag should not be deployed. In some embodiments, an airbag deployment system may control an airbag deployment pressure based on the 3D pose and/or size estimate of a vehicle occupant and/or an estimated size or age of the vehicle occupant derived at least in part from the 3D pose and/or size estimate. Moreover, in some embodiments, a 3D pose estimate generated by the occupant evaluation function described herein may be used for occupant posture classification, activity recognition, gaze detection, and human-machine interface (HMI) applications as well. Advantageously, the occupant evaluation function may produce 3D pose estimates that are invariant with respect to viewpoint providing a greater degree of leeway in determining the placement and/or orientation of the OMS optical image sensor that captures the image frames. As such, the OMS may not have to rely on a precise calibration of the orientation of the OMS optical image sensor to an in-cabin coordinate system to predict an occupant's size, shape, or pose.

More specifically, in some embodiments, the occupant monitoring system (OMS) described herein may determine the 3D representation of the vehicle occupant (such as their 3D size and/or 3D pose) by evaluating, for example, an image frame captured by an OMS optical image sensor and depth data captured by a point cloud depth sensor. The image frame may comprise a representation of the vehicle occupant from a perspective that is based at least in part on a position and orientation of the OMS optical image sensor within the vehicle cabin. In some embodiments, the OMS optical image sensor may comprise a monocular optical image sensor, such as a camera that captures standard RGB, IR, and/or RGB-IR image frames of the vehicle interior. In some embodiments, the OMS optical image sensor may comprise a depth-sensing camera that produces a 2D range image of the vehicle interior. The 2D range image may comprise an image frame of pixels where the pixel values of the pixels correspond to a distance from the depth-sensing camera to the elements in the depth-sensing camera's field of view.

In some embodiments, as described in greater detail below, the OMS comprises an occupant evaluation function that may predict a scale-normalized 3D pose estimate corresponding to a vehicle occupant, and then scale that 3D pose estimate to full-scale dimensions of linear measurement (e.g., inches or meters) based on the point cloud depth data to determine at least one characteristic representing a size of the occupant. The occupant evaluation function may execute a first processing path that performs operations to generate a representation of one or more features corresponding to at least a portion of the occupant based on optical image data (e.g., an image frame), and a second processing path that performs operations to determine a depth corresponding to the one or more features based on depth data derived from the optical image data and the point cloud depth data. In general, the depth information derived from the second processing path is used by the occupant evaluation function to provide a sense of absolute scale for generating a true-to-scale 3D representation of a vehicle occupant from the representation of the vehicle occupant generated by the first processing path of the occupant evaluation function.

The OMS and/or other vehicle system may use the 3D representation for various purposes, such as estimating other characteristics representative of a size of the occupant (e.g., estimating the occupant's height and/or body limb lengths). In some embodiments, the occupant evaluation function may generate one or more outputs comprising the 3D representation of the occupant that are used to control at least one operation of the vehicle based on the estimated occupant characteristic. For example, the characteristic representing the size of the occupant may be used in conjunction with a child presence detection system to estimate an age of the occupant, and/or control an alert system (e.g., alarm and/or notification systems) based on determining that an occupant under an estimated age threshold may have been inadvertently left alone in the vehicle. In some embodiments the characteristic representing the size of the occupant may be used in conjunction with other vehicle safety features. For example, in some embodiments, airbag deployments, driver monitoring systems, HMI applications, and/or other vehicle functions may be controlled based at least on a 3D pose and/or size estimate of the vehicle occupant.

In some embodiments, the occupant evaluation function processes an input optical image frame from an OMS optical image sensor to derive a 3D pose estimate for a vehicle occupant. In such an embodiment, the representation of one or more features corresponding to at least a portion of the occupant may comprise a scale-normalized 3D pose estimate. For example, in some embodiments, the occupant evaluation function may execute a first processing path that includes a person detection model and a 3D pose detection model (e.g., both of which may be implemented using one or more of a Convolutional Neural Network (CNN), Deep Neural Network (DNN), or other machine learning model architecture(s)). The image frame may be processed by the person detection model, which recognizes features of the occupant and crops the image to produce a cropped image (e.g., an image bounded by an outline of the occupant). Based on the cropped image, the 3D pose detection model may generate a scale-normalized 3D pose of the occupant. The scale-normalized 3D pose may comprise a 3D representation of kinematic elements (e.g., body limbs and/or joints) that indicates 3D coordinates for the kinematic elements. The 3D pose detection model may be trained, for example based on synchronized multi-view images of training subjects, and/or supervised training using single views, to produce 3D pose estimates using coordinates that are scale-normalized. That is, the 3D coordinates are scale-normalized in that they may indicate the dimensions and/or relative positions of kinematic elements in relation to each other, rather than in absolute terms (e.g., linear measurement units).

To map the scale-normalized 3D pose of the occupant to an absolute 3D pose, the second processing path of the occupant evaluation function determines an absolute 3D depth corresponding to at least one joint from the scale-normalized 3D pose using the depth data from the point cloud depth sensor. Using the at least one joint to anchor the scale-normalized 3D pose to an absolute scale, the occupant evaluation function may determine a set of absolute coordinates for the other kinematic elements of the scale-normalized 3D pose to derive an absolute 3D pose. In some embodiments, the point cloud depth sensor may generate depth data in the form of a point cloud around the vehicle occupant. As discussed in greater detail below, the point cloud depth sensor and optical image sensor may be calibrated with respect to their extrinsic parameters so that the 3D coordinates (x, y, z) of a point of the point cloud may be mapped using a rotation-translation (RT) transform to a 2D pixel coordinate (u, v) in the local 2D coordinate system. In other words, while a 2D image frame may capture a horizontal and vertical 2D pixel coordinate (u, v) of a kinematic element (e.g., a body joint of the occupant), the range value to that kinematic element is not known from the 2D image. The point cloud depth data from the point cloud depth sensor provides the occupant evaluation function with depth data corresponding to the pixels of the image frame that represent features corresponding to at least a portion of the occupant, including pixels that represent kinematic elements (such as the at least one body joint) of the occupant captured by the scale-normalized 3D pose.

The occupant evaluation function, having established coordinates for the position of the occupant's joint in three dimensions, may use that joint as an anchor joint to anchor the scale-normalized 3D pose to an absolute scale, from which the occupant evaluation function may determine a set of absolute coordinates for the other kinematic elements of the scale-normalized 3D pose to derive an absolute 3D pose. With an absolute 3D pose for the vehicle occupant determined, the occupant evaluation function may proceed with computing a size of the occupant based on limb length that may be computed, for example, as a function of distance between body joints. Because the 3D coordinates for the kinematic elements in the absolute 3D pose can be mapped directly to absolute distances, body limb lengths of the occupant may be directly computed from the 3D coordinates. For example, a width of the occupant's torso may be estimated by computing a distance between the 3D coordinates of the occupant's left and right shoulder joints. Based, for example, on summing various body limb lengths, the occupant evaluation function may estimate an overall size of the occupant. In some embodiments, an individual limb length may be computed as a distance between two consecutive attached joints. In some embodiments, a compound limb length may be computed as a function of a combination of kinematic elements. For example, the occupant's wingspan, which goes from the occupant's left wrist to the occupant's right wrist when their arms are extended, may define kinematic elements comprising a combination of individual limbs, and a compound limb length for the wingspan computed. In some embodiments, pre-programmed statistical information for human body proportions may be used to estimate body dimensions not directly derivable from the absolute 3D pose. For example, statistically, a person's height is usually about 1.1 times their wingspan. As such, if the absolute 3D pose is missing information about the occupant below the torso (e.g., if that portion of their body was blocked in the image frame), the occupant evaluation function may refer to statistical information for human body proportions to estimate their height based on deriving the length of their wingspan and multiplying by 1.1, for example.

As mentioned above, the point cloud depth sensor and optical image sensor may be calibrated with respect to their extrinsic parameters so that the 3D coordinates (x, y, z) of points of a point cloud produced by the point cloud depth sensor may be mapped to a 2D pixel location in an image frame produced by the optical image sensor. As such, a depth of a feature appearing at a 2D pixel coordinate in an image frame may be determined based on the depth of one or more points in the point cloud that correspond to the same feature, and therefore a 3D coordinate derived for that feature that includes a depth value corresponding to a range from the optical image sensor to the physical object in the cabin that is represented by the feature in the image frame. This mapping may be achieved using one or more calibration parameters that comprise a rotation-translation (RT) transform that describe the extrinsic relationship between the point cloud depth sensor and optical image sensor. More specifically, parameters that influence how a 3D volume of the vehicle interior appears when projected onto the 2D coordinate space of the 2D image frame include both extrinsic and intrinsic parameters. Extrinsic parameters may refer to factors that describe the physical orientation of the sensors, such as rotation and translation (also referred to as roll and tilt), and/or other parameters. Intrinsic parameters may refer to factors that describe sensor device optics, such as optical center (also known as the principal point), focal length, skew coefficient, field of view, and/or other parameters. While the intrinsic parameters of an occupant monitoring system (OMS) sensor can be established during manufacture, and are expected to remain stable, the extrinsic parameters of rotation and translation instead depend on how the OMS sensor is mounted and oriented within the space of the vehicle cabin. The optical image sensor's extrinsic and intrinsic parameters both play a part in how features of a scene within the 3D coordinate space of the vehicle cabin are mapped to the sensor-captured image frame. While a point cloud depth sensor already generates a point cloud mapped to a 3D coordinate space, extrinsic parameters corresponding to the physical orientation of the point cloud depth sensor (e.g., rotation and translation) also play a part in how features of the 3D scene of the vehicle cabin are mapped to the 3D coordinate space of the captured point cloud. The extrinsic parameters of both the point cloud depth sensor and optical image sensor are a function of how the respective sensors are mounted and oriented within the space of the vehicle cabin.

In some embodiments, to derive an RT transform that describe the extrinsic relationship between the point cloud depth sensor and optical image sensor, an initial framework may first be established for a shared 3D intermediary coordinate system that may be used to reference the 3D position of features detected by both the point cloud depth sensor and the optical image sensors. In some embodiments, extrinsic calibration parameters representing translation and rotation of a point cloud depth sensor may be determined in order to compute a first transform (H1) between the point cloud depth sensor's 3D coordinate system and the 3D intermediary coordinate system. Likewise, the extrinsic calibration parameters representing translation and rotation of an optical image sensor may be determined to compute a second transform (H2) between the optical image sensor's 2D coordinate system and the 3D intermediary coordinate system. The relationship to map the point cloud depth sensor's 3D coordinate system and the optical image sensor's 2D coordinate system can be represented as a function of the H1 and H2 transforms. For example, captured point cloud depth sensor data may be translated to a position in an image frame in the optical image sensor's 2D coordinate system by a third transform (H3) by the expression H3=$f$(H2, H1), or H3=H2×H1.

In some embodiments, such a shared 3D intermediary coordinate system may be generated by reconstructing a 3D volume representative of the vehicle interior, using the relative position of a plurality of calibration targets that are distributed across a field of view within a vehicle interior space. The plurality of calibration targets together may form a system of calibration targets that define a reference frame within the vehicle interior space for the 3D intermediary coordinate system. In some embodiments, the calibration targets may include a structural substrate (e.g., a generally planar board or sheet comprising a rigid material) that includes one or more fiducial point markers (alternatively referred to as "fiducial markers") and one or more motion targets. The one or more fiducial markers may comprise an array of visual fiducial system patterns, (e.g., ARtags, AprilTags, QR codes, etc.) that facilitate computing precise 3D position, orientation, and/or identify of the fiducial markers. The number of calibration targets in the system of calibration targets may vary as a function of the size of the interior space, but generally should be distributed to span the area to be monitored, have a diversity of alignments (e.g., arranged to align with at least two distinct intersecting planes within the interior space), and be sufficient in number to produce robust H1, H2, H3 transforms. For a non-limiting example, for a typical vehicle cabin of a consumer automobile, the system of calibration targets may include five calibration targets with a calibration target positioned on the driver's seat cushion, a calibration target positioned on the driver's seat back cushion, a calibration target positioned on the front passenger's seat cushion, a calibration target positioned on the front passenger's seat back cushion, and a calibration target positioned on the center console between the driver's seat and the front passengers seat. Additional information for such a system of calibration targets may be found in U.S. patent application Ser. No. 17/935,473, filed on Sep. 26, 2022, titled, "Multi-Modal Sensor Calibration For In-Cabin Monitoring Systems And Applications" which is incorporated herein by reference in its entirety.

With the system of calibration targets in place, the 3D intermediary coordinate system may be generated using 3D reconstruction algorithms that generate 3D models of a space from a set of images. For example, in some embodiments, 3D reconstruction algorithms may be applied that take as input a plurality of images (e.g., on the order of 20 images) capturing each of the calibration targets—with their more fiducial markers clearly visible. The camera(s) used to capture the images of calibration targets (at least for the purpose of 3D reconstruction) may be one or more cameras with known intrinsic parameters, and may include one or more of the optical image sensors of the interior monitoring system, or other optical image sensors. Appling the plurality of images and camera intrinsic parameters as input, the 3D reconstruction algorithm may generate the RT transform (e.g., a transformation matrix) that maps between an individual calibration target's local reference system to a 3D intermediary coordinate system generated by the 3D reconstruction algorithm. The relationship between the point cloud depth sensor's 3D coordinate system and the optical image sensor's 2D coordinate system can be represented as a function of the H1 and H2 RT transforms obtained in this manner. For example, captured depth cloud sensor data may be translated to a position in an image frame in the optical image sensor's 2D coordinate system by the third transform, H3 (e.g., using the expression H3=H2×H1 as discussed above). Point cloud depth sensor measurements of a detected feature may thus be correlated with optical image sensor data for the detected features via a calibration transform based on the H3 transform. The calibration transform may be saved to memory as an extrinsic calibration parameter to correlate sensor data from the point cloud depth sensor with sensor data from the optical image sensor.

In some embodiments, an OMS that performs occupant evaluation may be used in an interior space of a vehicle besides a passenger cabin. For example, one or more of the embodiments described herein may determine 3D pose and/or shape estimates using optical image data for occupants within a trunk, cargo bed, or other space. While embodiments presented in this disclosure may be implemented in the context of vehicle occupant monitoring systems (including driver monitoring systems) for vehicles such as, but not limited to, non-autonomous vehicles, semi-autonomous vehicles, piloted and un-piloted robots or robotic platforms, warehouse vehicles, off-road vehicles, vehicles coupled to one or more trailers, aircraft, spacecraft, boats, shuttles, emergency response vehicles, construction vehicles, underwater crafts, drones, and/or other vehicle types, other embodiments may include determining extrinsic calibration parameters for sensors that capture image frames of other interior spaces, such as rooms, warehouses, gymnasiums, containers, airport terminals, mines, factories, construction zones, and/or studio sets, as suitable examples and without limitation, in order to monitor occupants of such spaces.

The various sensor data processing, pose estimation, size estimation, and/or other models, functions, and algorithms, disclosed herein, may be executed at least in part on one or more processing units, such as one or more graphics processing units that may operate in conjunction with software executed on a central processing unit coupled to a memory. The graphics processing units may be programmed to execute kernels to implement one or more aspects of functions for occupant monitoring described herein. In some embodiments, the execution of some algorithms may be distributed and performed by a combination of processors and cloud computing resources.

With reference to FIG. 1, FIG. 1 is an example data flow diagram for a system 100 for image-based three-dimensional occupant assessment, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

As shown in FIG. 1, the image-based three-dimensional occupant assessment system 100 may include an occupant evaluation function 110 that comprises at least one occupant feature detection model 120, a sensor calibration transform 112, and an occupant feature scaling function 130. The occupant feature detection model 120 may be implemented for example, using a machine learning module that may be implemented, for example, using a convolutional neural network (CNN), a deep neural network (DNN), and/or other neural network architecture.

The occupant evaluation function 110 may execute a first processing path that comprises the occupant feature detection model 120 and generates a representation of one or more features of a vehicle occupant based on optical image data 107 that comprises a representation of the vehicle occupant (e.g., an optical image frame) captured by one or more optical image sensors 106 that may be positioned within the vehicle interior 105 (e.g., the interior of vehicle 800). An optical image sensor 106 may comprise, for example, a camera or other optical sensor that captures RGB, IR, and/or RGB-IR image frames. In some embodiments, the optical image sensor 106 may comprise an OMS sensor such as the OMS sensor(s) 801 described with respect to FIG. 8A. In some embodiments, optical image data 107 may comprise image data that includes a fusion of images from multiple optical image sensors 106.

The occupant evaluation function 110 may execute a second processing path that receives point cloud depth data 109 generated by a point cloud depth sensor 108 (e.g., a RADAR sensor, a LIDAR sensor, and/or other sensor that generated depth data in the form of a point cloud). As shown in FIG. 1, the occupant evaluation function 110 may receive the point cloud depth data 109 and apply a calibration transform 112 to generate calibrated point cloud depth data 113.

In some embodiments, the calibration transform 112 may comprise a rotation-translation (RT) transform that describes the extrinsic relationship between the point cloud depth sensor 108 and the optical image sensor 106. More specifically, parameters that influence how a 3D volume of the vehicle interior 105 appears when projected onto the 2D coordinate space of the optical image data 107 include both extrinsic and intrinsic parameters. Extrinsic parameters of the optical image sensor 106 may include factors that describe the physical orientation of the optical image sensor 106, such as rotation and translation (also referred to as roll and tilt), and/or other parameters. Similarly, extrinsic parameters of the point cloud depth sensor 108 may include factors that describe the physical orientation of the point cloud depth sensor 108, such as rotation and translation (also referred to as roll and tilt), and/or other parameters. As such extrinsic parameters of the optical image sensor 106 and point cloud depth sensor 108 both play a part in how features of a scene within the 3D coordinate space of the vehicle cabin from the viewpoint of the optical image sensor 106 are mapped to the point cloud depth data 109 captured from the viewpoint of the point cloud depth sensor 108. The extrinsic parameters of both the point cloud depth sensor 108 and the optical image sensor 106 are a function of how the respective sensors are mounted and oriented within the space of the vehicle interior 105.

Using the calibration transform 112, the point cloud depth sensor 108 and optical image sensor 106 may be calibrated together with respect to their extrinsic parameters so that the 3D coordinates (x, y, z) of points of the point cloud depth data 109 produced by the point cloud depth sensor 108 may be mapped to a 2D pixel location in an image frame of the optical image data 107 produced by the optical image sensor 106. As such, a depth of a feature appearing at a 2D pixel coordinate in an image frame of the optical image data 107 may be determined based on the depth of one or more points in the point cloud of the calibrated point cloud depth data 113 that correspond to the same feature. The 3D coordinate derived for that feature may include a depth value corresponding to a range from the optical image sensor 106 to the physical object in the cabin that is represented by the feature in the image frame.

The occupant evaluation function 110 may apply the representation of one or more features of a vehicle occupant from the occupant feature detection model 120 and the calibrated point cloud depth data 113 to the occupant feature scaling function 130 to determine an absolute (e.g., true-scale) depth corresponding to the one or more occupant features and/or generate a three-dimensional representation of the occupant that is output as 3D occupant representation data 140. The 3D occupant representation data 140 may include at least one characteristic representative of a size of the occupant (e.g., the occupant's height and/or body limb lengths). Characteristics included in the 3D occupant representation data 140 may comprise a representation such as a 3D pose estimate, a 3D size estimate, and/or a 3D shape estimate of the vehicle occupant. At least one operation of the vehicle may then be controlled based on the characteristic.

For example, based at least in part on the 3D occupant representation data 140, an interior monitoring system 150

(which may implement one or more components of the OMS) may generate one or more output(s) 154. Output(s) 154 may be generated using one or more machine learning models and/or deep neural networks (DNNs) 152. As an example, the interior monitoring system 150 may use 3D occupant representation data 140 (either alone or in combination with other data such as optical image data 107) to predict the presence and/or location of occupants—such as objects, persons, and/or animals—within the interior space of the vehicle 800. Other systems of the vehicle 800 may determine one or more actions to take based on the predictions, and/or may control other tasks or operations. For example, based on output(s) 154, an alarm or warning may be generated, door locks and/or windows may be operated, various functions may be turned on/off, data for a digital assistant, chat bot, digital avatar, and/or the like may be generated, and/or air conditioning or air circulation functions may be operated. In some embodiments, the characteristic representing the size of the occupant from the 3D occupant representation data 140 may be used in conjunction with a child presence detection system to estimate an age of the occupant, and/or control an alert system (e.g., alarm and/or notification systems) based on determining that an occupant under an estimated age threshold may have been inadvertently left alone in the vehicle. In some embodiments, the characteristic representing the size of the occupant may be used in conjunction with other vehicle safety features. For example, in some embodiments, airbag deployments, driver monitoring systems, HMI applications, and/or other vehicle functions may be controlled based at least on a 3D pose, 3D shape, and/or 3D size estimate of the vehicle occupant provided by the 3D occupant representation data 140.

Figure 2:
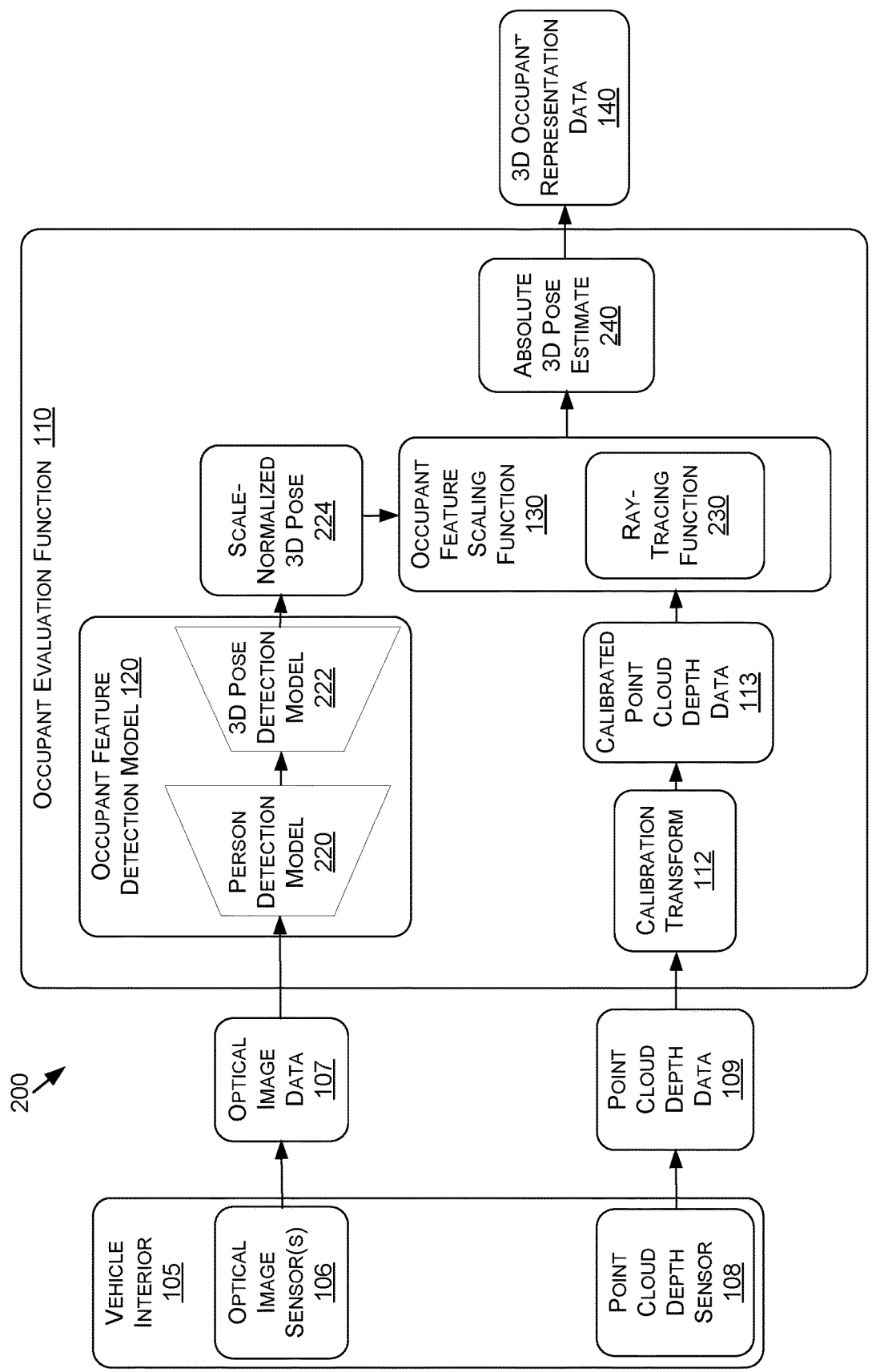
FIG. 2 is an example data flow diagram of a system for an example implementation of 3D pose based three-dimensional occupant assessment, in accordance with some embodiments of the present disclosure.

With reference to FIG. 2, FIG. 2 is an example data flow diagram of a system 200 for an example 3D pose based implementation of the image-based three-dimensional occupant assessment such as shown in FIG. 1, in accordance with some embodiments of the present disclosure.

In the embodiment shown in FIG. 2, the occupant evaluation function 110 processes optical image data 107 from the optical image sensor 106 and point cloud depth data 109 from the point cloud depth sensor 108 to derive 3D occupant representation data 140 that comprises a 3D pose estimate for a vehicle occupant. In the example embodiment of FIG. 2, the occupant feature detection model 120 may comprise a person detection model 220 and a 3D pose detection model 222, that use the optical image data 107 to generate a scale-normalized 3D pose estimate 224 for a vehicle occupant. The scale-normalized 3D pose estimate 224 may comprise a representation of one or more features corresponding to at least a portion of the occupant. The person detection model 220 and/or 3D pose detection model 222 may be implemented, for example, using one or more of a Convolutional Neural Network (CNN), Deep Neural Network (DNN), or other machine learning model architecture(s). The optical image data 107 may be processed by the person detection model 220, to detect features of the vehicle occupant, for example, to produce a cropped image of the vehicle occupant (e.g., an image bounded by an outline of the vehicle occupant). In some embodiments, when the person detection model 220 detects more than one occupant, separate cropped images of the vehicle occupants may be produced and individually processed for each occupant as described herein.

Based on the detected features (e.g., the cropped image) of the vehicle occupant produced by the person detection model 220, the 3D pose detection model 222 may generate the scale-normalized 3D pose 224 of the occupant. The scale-normalized 3D pose 224 may comprise a 3D representation of kinematic elements of the vehicle occupant (e.g., one or more body limbs and/or joints), and may indicate relative positions of using 3D coordinates for those kinematic elements. In other words, the 3D pose detection model 222 may receive the cropped images of the occupant from the person detection model 220, and predict the scale-normalized 3D pose 224 for the vehicle occupant, based on the captured optical image data 107. As further discussed herein, the 3D pose detection model 222 may comprise a machine learning model trained based on synchronized multi-view images of training subjects, and/or supervised training using single views, to produce the scale-normalized 3D pose 224. That is, the 3D coordinates are scale-normalized in that they may indicate the dimensions and/or relative positions of kinematic elements in relation to each other, rather than in absolute terms (e.g., linear measurement units).

In some embodiments, the scale-normalized 3D pose 224 of the vehicle occupant may be derived temporally based on optical image data 107 that comprises a sequence of image frames from the optical image sensor 106. In such a temporal embodiment, the 3D pose detection model 222 may receive a sequence of cropped images from the person detection model 220 and predict a corresponding sequence of scale-normalized 3D poses 224 with corresponding confidence scores. The occupant evaluation function 110 may implement a voting function to, for example, select from the sequence a scale-normalized 3D pose having the highest confidence score, and/or select a composite scale-normalized 3D pose based on a subset of the sequence having pose estimates that are most in agreement (e.g., within an alignment threshold) to arrive at the scale-normalized 3D pose 224. In some embodiments, the 3D pose detection model 222 may compute scale-normalized 3D pose estimates at different periodicities, such as computing single frame-based scale-normalized 3D pose that may be generated quickly, and a scale-normalized 3D pose derived from optimizing sequences of image frames and/or 3D pose estimates over predefined time windows. Sequences of image frames may be evaluated to better discern moving objects in the scene in order to focus the person detection model 220 and/or the 3D pose detection model 222 on processing a dynamic segment of optical image data 107 over a static region.

As discussed above, the calibrated point cloud depth data 113 may correlated to the coordinate frame of the optical image data 107 (e.g., using the calibration transform 112), to determine an absolute 3D depth of at least one anchor joint appearing in the optical image data 107. The absolute depth may be used by the scaling function 130 to determine a set of absolute coordinates for the other kinematic elements of the scale-normalized 3D pose 224 to derive an absolute 3D pose estimate 240 of the vehicle occupant to produce the 3D occupant representation data 140. The points of the calibrated point cloud depth data 113, may each correspond to a distance from the optical image sensor 106 to sensed elements (e.g., objects) in the optical image sensor 106's field of view appearing in an image frame of the optical image data 107. Therefore, the calibrated point cloud depth data 113 may be correlated to the scale-normalized 3D pose 224 by the occupant feature scaling function 130 to determine depths for the features of the occupant including the depth of at least one kinematic element for the anchor joint.

Figure 3:
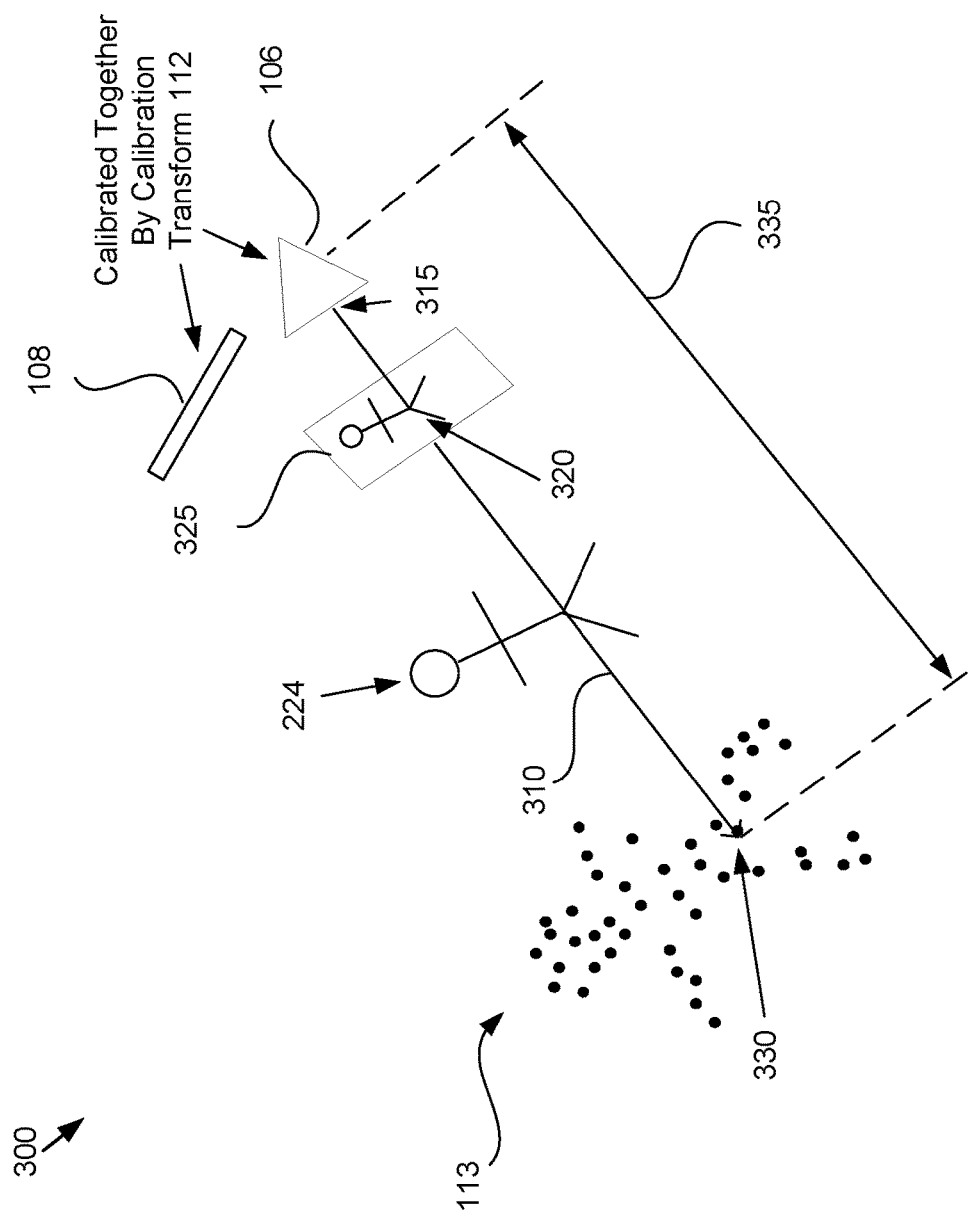
FIG. 3 is a diagram illustrating determination of absolute depth for one or more kinematic elements using point cloud depth data, in accordance with some embodiments of the present disclosure.

In some embodiments, the occupant feature scaling function 130 may transform the scale-normalized 3D pose 224 to the absolute 3D pose estimate 240 using a ray-tracing function 230 to map the depth of point clouds in the calibrated point cloud depth data 113 back to pixels of an image frame from the optical image data 107, and determine where pixels corresponding with a kinematic element of the scale-normalized 3D pose 224 interact with point of the calibrated point cloud depth data 113. For example, the occupant feature scaling function 130 may select a preferred kinematic element (e.g., a body joint) observable from the optical image data 107 to define as the anchor joint. The occupant feature scaling function 130 may comprise a predetermined prioritized list of body joints, and may select a body joint that is observable from the optical image data 107 based on the prioritized list (e.g., a joint indicated as having a preferred priority) to define as the anchor joint. For example, neck, hip, or other torso body joints typically would serve well as preferred anchor joints because for a seated vehicle occupant, these joints are generally limited in their motion and range of positions (e.g., in contrast to joints such as elbows and/or wrists). As such, it is generally easier for the 3D pose detection model 222 to confidently identify such kinematic elements as opposed to extremities. As illustrated in FIG. 3 at 300, the occupant feature scaling function 130 may apply the ray-tracing function 230 to compute a ray 310 that extends from a center 315 of the optical image sensor 106 through a 2D pixel coordinate (u, v) of an image frame 325 (e.g., from the optical image data 107) corresponding to a selected anchor joint 320. The ray-tracing algorithm may determine a point (and/or cluster of points) 330 from the calibrated point cloud depth data 113 that is closest to the ray 310, and assign a depth value 335 to the selected anchor joint 320 based on the depth indicated by the depths of the point(s) closest to the ray 310. Based on the absolute depth of the selected anchor joint 320, and the relative positions of the other kinematic elements indicated by the scale-normalized 3D pose 224, the occupant feature scaling function 130 may scale one or more of the other kinematic elements of the scale-normalized 3D pose 224 as a function of their relative positions and distances with respect to the anchor joint.

In some embodiments, a plurality of anchor joints 320 may be selected and evaluated by having the ray-tracing function 230 extend a plurality of rays 310 to identify depths for a plurality of different detected body joints observable from the optical image data 107. The occupant feature scaling function 130 may apply an optimization algorithm to optimally correlate distances determined by the ray-tracing function 230 for multiple rays and assign depths to the different body joints. In some embodiments, the calibrated point cloud depth data 113 may be generated by accumulating point cloud depth data 109 over a predefined time duration to obtain a more stable representation of the vehicle occupant in the point cloud depth data 109.

Referring again to FIG. 2, the occupant evaluation function 110 may proceed with computing the 3D representation data 140 that comprises at least one characteristic representative of a size of the occupant. Because the 3D coordinates for the kinematic elements in the absolute 3D pose 240 can be used directly to determine absolute distances, body limb lengths of the occupant may be directly computed from those 3D coordinates. For example, a width of the occupant's torso may be estimated by computing a distance between the 3D coordinates of the occupant's left and right shoulder joints, as indicated by the absolute 3D pose estimate 240. Accordingly, by summing various body limb lengths, the occupant evaluation function 110 may estimate an overall 3D size of the occupant that may be included in the 3D occupant representation data 140. In some embodiments, an individual limb length may be computed as a distance between two consecutive attached joints. In some embodiments, a compound limb length may be computed as a function of a combination of kinematic elements. For example, the occupant's wingspan, which goes from the occupant's left wrist to the occupant's right wrist when their arms are extended, may define kinematic elements comprising a combination of individual limbs, and a compound limb length for the wingspan computed. In some embodiments, the occupant evaluation function 110 uses pre-programmed statistical information for human body proportions to estimate body dimensions not directly derivable from the absolute 3D pose. For example, statistically, a person's height is about 1.1 times their wingspan. As such, if the absolute 3D pose estimate 240 is missing kinematic information about the occupant below the torso (e.g., if that portion of their body was blocked in the image frame), the occupant evaluation function 110 may refer to statistical information for human body proportions to estimate an occupant height based on deriving the length of their wingspan and multiplying by 1.1, for example.

In some embodiments, the 3D pose detection model 222 may be trained to produce the scale-normalized 3D pose 224 based on synchronized multi-view images of training subjects, and/or supervised training using single views, to produce 3D pose estimates using coordinates that are scale-normalized. Constraining the 3D pose detection model 222 to the task of predicting relative-scale 3D poses allows it to output more accurate predictions by preventing it from learning to predict estimates for the ill-posed problem of directly predicting depth information from a single 2D image. In some embodiments, the 3D pose detection model 222 may be trained based on multi-view training with real world data obtained by capturing synchronized sets of 2D images (e.g., as described in U.S. patent application Ser. No. 18/349,842, filed on Jul. 10, 2023, which is incorporated herein by reference in its entirety), to produce a 3D perception model from 2D image data. In some embodiments, the 3D pose detection model 222 may further, or instead, be trained using synthetic 3D pose ground truth data. Synthetic 3D pose ground truth data permits the 3D pose detection model 222 to be trained from data that captures simulated training subjects having a wide diversity of demographics and in a variety of vehicles. Additionally, synthetic data inherently provides full 3D pose ground truth, which aids in the ability to directly supervise the 3D pose detection model 222 training process.

As further discussed below with respect to FIG. 5, in some embodiments, training of the 3D pose detection model 222 may further include training using point cloud depth data. For example, training of the 3D pose detection model 222 may incorporate an early fusion of the image data and point cloud depth data of a training subject as training inputs to the 3D pose estimator. As such, in circumstances when body joints are occluded or limited in number in an image frame, the 3D pose detection model 222 may further leverage the point cloud depth data to predict where body joints may be to arrive at a scale-normalized or absolute 3D pose estimate.

Figure 4:
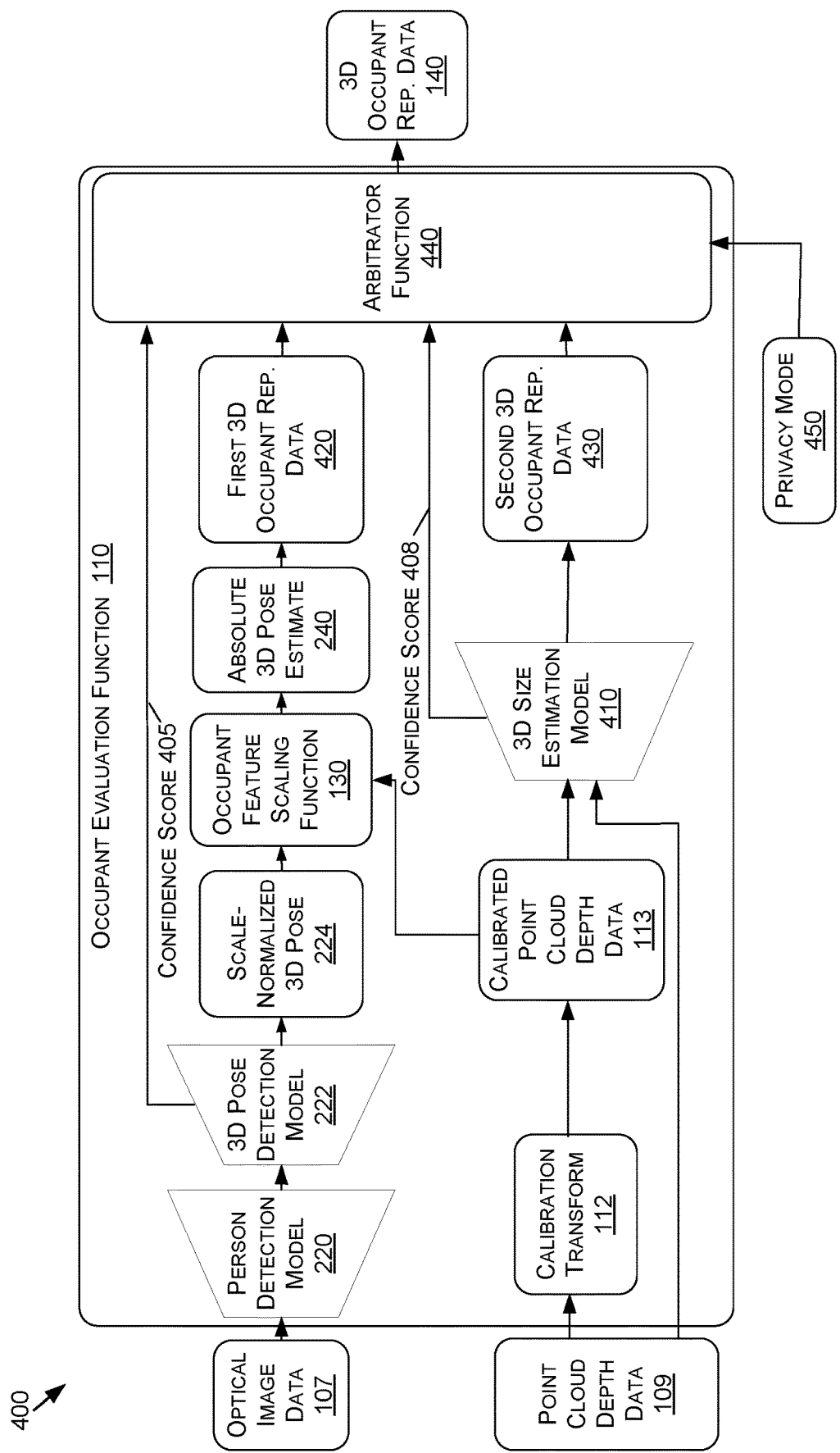
FIG. 4 is an example data flow diagram of a system comprising a late fusion implementation of multi-modal sensor based three-dimensional occupant assessment, in accordance with some embodiments of the present disclosure.

With reference to FIG. 4, FIG. 4 is an example data flow diagram of a system 400 for an example late fusion based implementation of the image-based three-dimensional occupant assessment, in accordance with some embodiments of the present disclosure. In these embodiments, similarly to the embodiment of FIG. 2, the occupant evaluation function 110 comprises a person detection model 220 and a 3D pose detection model 222 that use the optical image data 107 to generate a scale-normalized 3D pose estimate 224 for a vehicle occupant. Based on the detected features (e.g., the cropped image) of the vehicle occupant produced by the person detection model 220, the 3D pose detection model 222 may generate the scale-normalized 3D pose 224 of the occupant. The scale-normalized 3D pose 224 may comprise a 3D representation of kinematic elements of the vehicle occupant (e.g., one or more body limbs and/or joints), and may indicate relative positions of using 3D coordinates for those kinematic elements.

In the late fusion embodiment of FIG. 4, when the 3D pose detection model 222 generates the scale-normalized 3D pose 224, it may further compute and output a corresponding confidence score 405 indicating a level of confidence in the accuracy of the scale-normalized 3D pose 224. Several factors may cause lower levels of confidence such as, for example, lighting conditions interfering with clear images of kinematic elements in image frames. Similarly, lower levels of confidence may produce a lower confidence score 405 if one or more preferred kinematic elements are occluded (e.g., if torso body joints are block from view of the optical image sensor, leaving only extremity body joins discernable). To address such instances, in some embodiments, late cloud sensor data fusion may be used to increase confidence in the 3D occupant representation data 140 produced by the occupant evaluation function 110. In general, point cloud sensor data 109 is generally limited in resolution. Point cloud sensor data 109 may also be limited with respect to its utility in being able to precisely identify kinematic elements directly from points in point cloud sensor data 109, and limited with respect to discerning a distinct boundary between which points correspond to a vehicle occupant, and which points are not. That said, point cloud sensor data 109 generated using RADAR signals, for example, are advantageously able to penetrate at least some of the structural elements of the vehicle interior 105 that might otherwise occlude features of the occupant from appearing in an image frame of the optical image data 107. Similarly, RADAR and/or LIDAR signals may remain unaffected by lighting conditions within the cabin that might otherwise affect optical image sensors 106. As such, in some embodiments, the occupant evaluation function 110 may include at least one 3D size estimation model 410 that may predict a size of a vehicle occupant based on the point cloud depth data (e.g., point cloud depth data 109 and/or calibrated point cloud depth data 113) generated by a point cloud depth sensor 108 such as a RADAR and/or LIDAR sensor. For example, the occupant evaluation function 110 may include a 3D size estimation model 410 trained to predict a 3D size (and/or other representation of size such as a height metric, for example) of an vehicle occupant based on, for example, a size of a grouping of points in the point cloud data predicted by the 3D size estimation model 410 to correspond to the vehicle occupant. The 3D size estimation model 410 may be implemented, for example, using one or more of a Convolutional Neural Network (CNN), Deep Neural Network (DNN), or other machine learning model architecture(s). The 3D size estimation model 410 may further compute and output a corresponding confidence score 408 indicating a level of confidence in the accuracy of a 3D size estimate generated by the 3D size estimation model 410.

In some embodiments, the occupant evaluation function 110 may generate a first set of 3D occupant representation data 420 based on an absolute 3D pose estimate 240 produced by the occupant scaling function 130 (e.g., in the same manner as described with respect to FIG. 2), and may output a confidence score 405 for the first set of 3D occupant representation data 420. The occupant evaluation function 110 may generate a second set of 3D occupant representation data 430 based on the estimate of vehicle occupant size generated by the 3D size estimation model 410, and may output a confidence score 408 for the second set of 3D occupant representation data 430.

The occupant evaluation function 110 may further include an arbitrator function 440 that selects between the first set of 3D occupant representation data 420 and the second set of 3D occupant representation data 430 (e.g., based on one or both of confidence score 405 and confidence score 408) and outputs the selected representation data as the 3D occupant representation data 140. For example, in some embodiments, the arbitrator function 440 may compare the confidence score 405 of the first set of 3D occupant representation data 420 derived from the absolute 3D pose estimate 240 and against an acceptance threshold. When the confidence score 405 indicates that confidence in the first set of 3D occupant representation data 420 meets or exceeds the acceptance threshold, the arbitrator function 440 selects the first set of 3D occupant representation data 420 to output as 3D occupant representation data 140. Correspondingly, when the confidence score 405 indicates that confidence in the first set of 3D occupant representation data 420 does not meet or exceed the acceptance threshold, the arbitrator function 440 selects the second set of 3D occupant representation data 430 to output as 3D occupant representation data 140. In some embodiments, the arbitrator function 440 may compare the 3D pose estimate confidence score 405 against the 3D size estimate confidence score 408, and select between the first set of 3D occupant representation data 420 and the second set of 3D occupant representation data 430 based on which has the better corresponding confidence score. In some embodiments, if the confidence scores 405 and 408 are within a threshold difference of each other, the arbitrator function 440 may compute a 3D size for the occupant based on, for example, an averaging of 3D sizes derived from the first set of 3D occupant representation data 420 and the second set of 3D occupant representation data 430.

In some embodiments, the arbitrator function 440 may elect to defer to a 3D size of the second set of 3D occupant representation data 420 derived from the point cloud depth data 109 based on other considerations. For example, in some embodiments the occupant evaluation function 110 may comprise a privacy mode of operation (shown at 450). When the privacy mode 450 is activated, the occupant evaluation function 110 may deactivate the processing of image frames from the optical image sensor 106. As such, the 3D pose detection model 222 may be unable to produce the first 3D occupant representation data 420. In such an embodiment, the arbitrator function 440 may receive an indication of the activation of the privacy mode 450 and automatically select the second set of 3D occupant representation data 430 to output as the 3D occupant representation data 140 while in that mode of operation.

Figure 5:
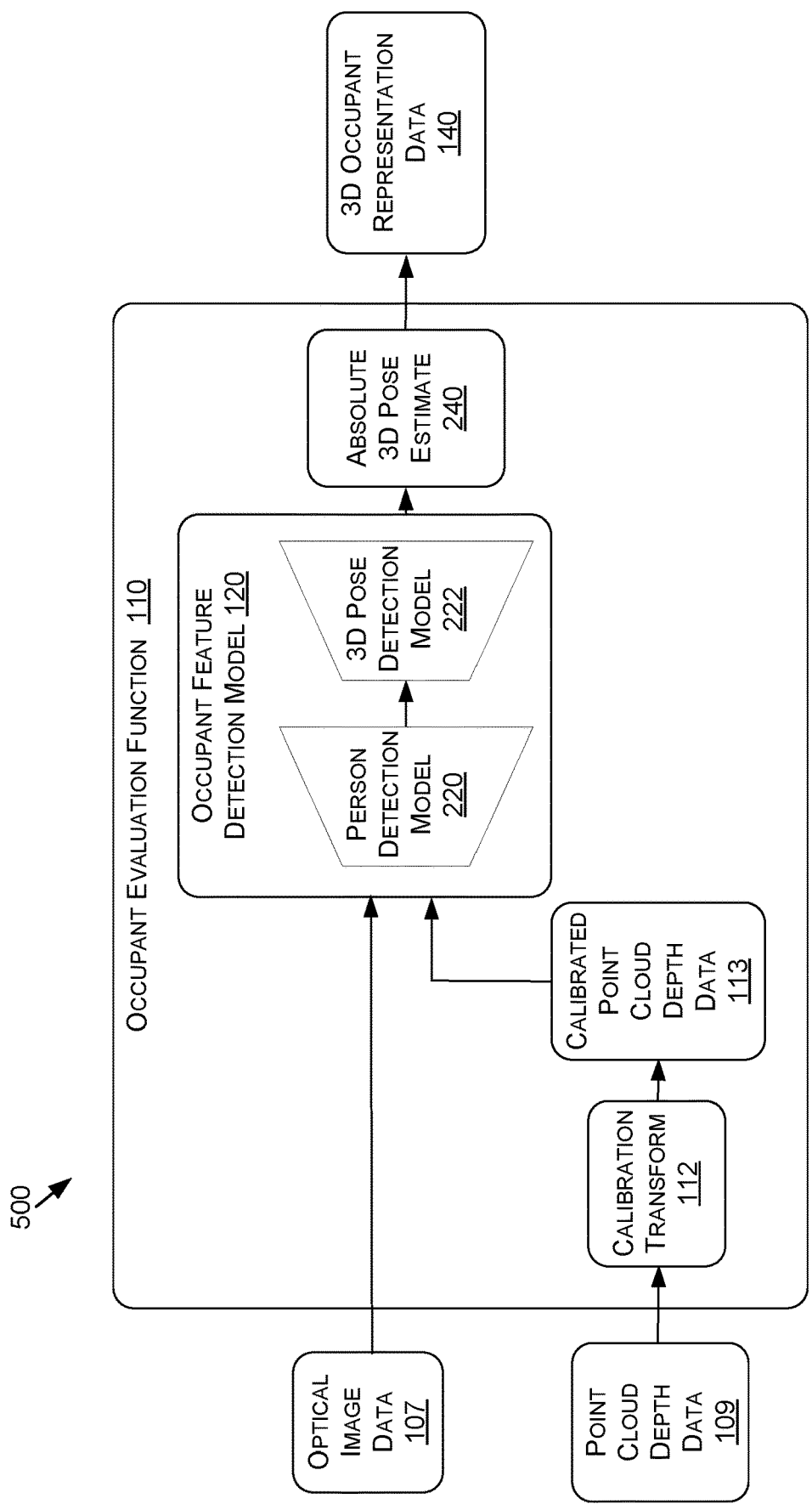
FIG. 5 is an example data flow diagram of a system comprising an early fusion implementation of multi-modal sensor based three-dimensional occupant assessment, in accordance with some embodiments of the present disclosure.

With reference to FIG. 5, FIG. 5 is an example data flow diagram of a system 500 for an example early fusion based implementation of an image-based three-dimensional occupant assessment, in accordance with some embodiments of the present disclosure. In the embodiment of FIG. 5, the calibrated point cloud depth data 113 is applied to the occupant feature detection model 120 together with the optical image data 107 to produce the absolute 3D pose estimate 240. For example, the optical image data 107 may be processed by the person detection model 220 to detect features of the vehicle occupant, for example, to produce a cropped image of the vehicle occupant as discussed above with respect to FIG. 2. Based on the detected features of the vehicle occupant produced by the person detection model 220 and the calibrated point cloud depth data 113, the 3D pose detection model 222 may generate a 3D pose estimate that comprises an absolute 3D pose estimate 240. That is, because the 3D pose detection model 222 receives the calibrated point cloud depth data 113 together with the optical image data 107, it receives information conveying a sense of true depth corresponding to the detected features of the vehicle occupant so that it may infer the 3D position of kinematic elements of the vehicle occupant in an absolute sense rather than merely in a relative (e.g., scale-normalized) sense and thus infer the absolute 3D pose estimate 240 directly. In some embodiments, training of the 3D pose detection model 222 may further include training using point cloud depth data such as generated by a point cloud depth sensor 109. For example, training of the 3D pose detection model 222 may incorporate early fusion of optical image data and point cloud depth data captured from a training subject as training inputs. Advantageously, in circumstances when body joints are occluded or limited in number in an image frame of optical image data 107, the 3D pose detection model 222 may further leverage the calibrated point cloud depth data 113 to predict where body joints may be positioned, to predict the absolute 3D pose estimate 240 used to produce the 3D occupant representation data 140.

Figure 6:
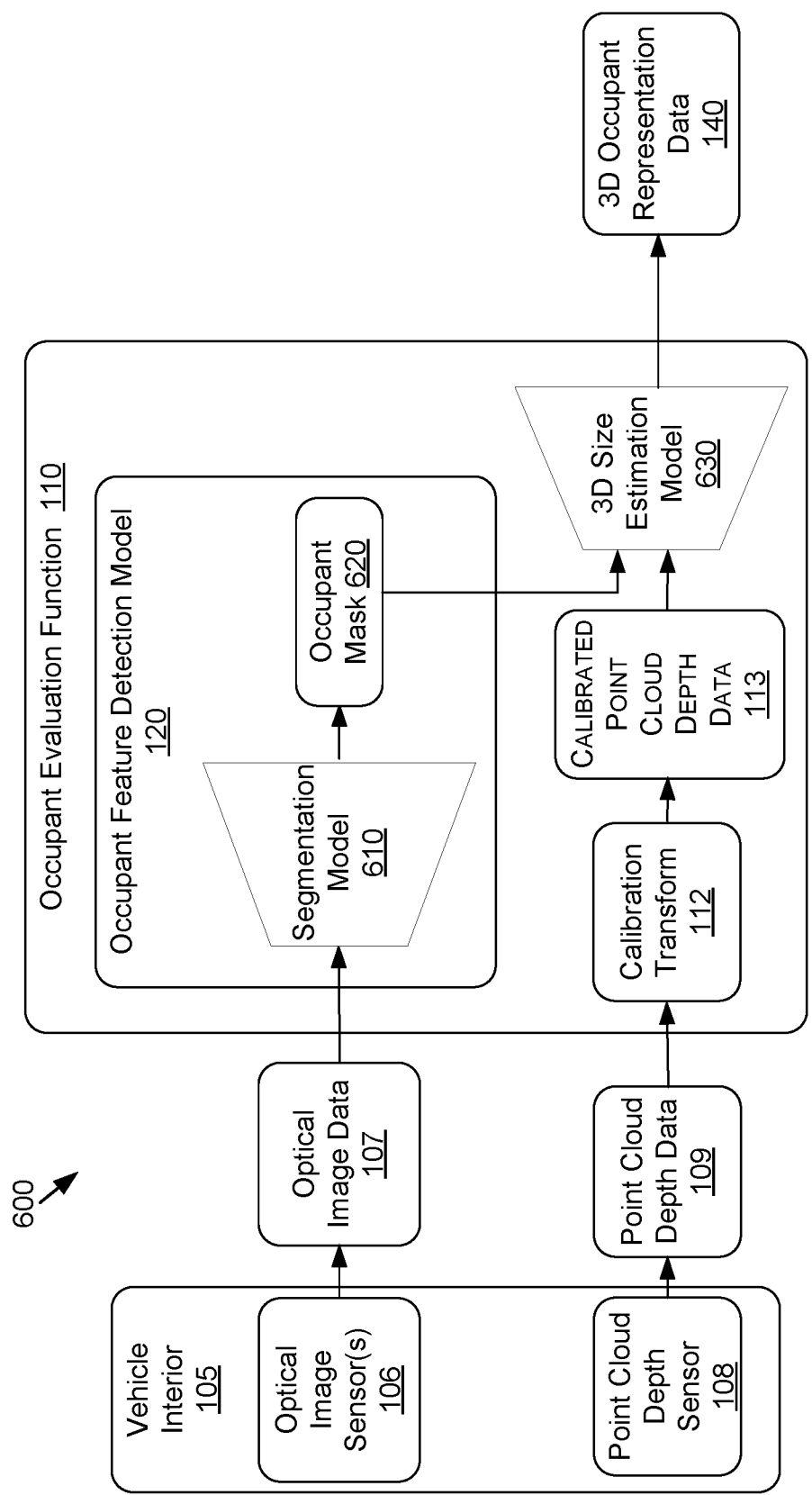
FIG. 6 is an example data flow diagram of a system comprising a system for multi-modal sensor based three-dimensional occupant assessment using point cloud depth data based three-dimensional size estimation, in accordance with some embodiments of the present disclosure.

With reference to FIG. 6, FIG. 6 is an example data flow diagram of a system 600 for an example three-dimensional occupant assessment based on occupant size inference, in accordance with some embodiments of the present disclosure. In the embodiment of FIG. 6, an output of the occupant feature detection model 120 may be used to augment calibrated point cloud depth data 113 as inputs to a 3D size estimation model 630. The 3D occupant representation data 140, in some embodiments, may then be derived from a 3D size estimate inferred by the 3D size estimation model 630. Fusion of optical image data 107 with the calibration point cloud depth data 113 may thus be used to improve estimates of occupant 3D size that are predicted primarily based on the point cloud depth data 109. As previously discussed, the point cloud depth sensor 108 and optical image sensor 106 may be calibrated with respect to their extrinsic parameters by the calibration transform 112 so that the 3D coordinates (x, y, z) of a point of the point cloud and 2D pixel coordinates (u, v) of an optical image frame may be mapped together. In some embodiments, the occupant feature detection model 120 may include a segmentation model 610 (e.g., which may function as a masking model) to define from the optical image data 107 an occupant boundary—corresponding to pixels of an image frame that envelope captured features of the vehicle occupant. The occupant evaluation function 110 may include a size estimation model 630 trained to predict a 3D size (and/or other representation of size such as a height metric, for example) of the occupant based on points in the calibrated point cloud depth data 113 that fall within the occupant boundary defined by the occupant mask 620. The size estimation model 630 may be implemented, for example, using one or more of a Convolutional Neural Network (CNN), Deep Neural Network (DNN), or other machine learning model architecture(s). By limiting the calibrated point cloud depth data 113 considered by the size estimation model 630 to those points within the predicted occupant boundary defined by the occupant mask 620, the occupant evaluation function 110 may disregard (e.g., filter or ignore) noisy points in the calibrated point cloud depth data 113 extraneous to determining the occupant's size and therefore produce a 3D size estimate for 3D occupant representation data 140 having greater accuracy.

Figure 7:
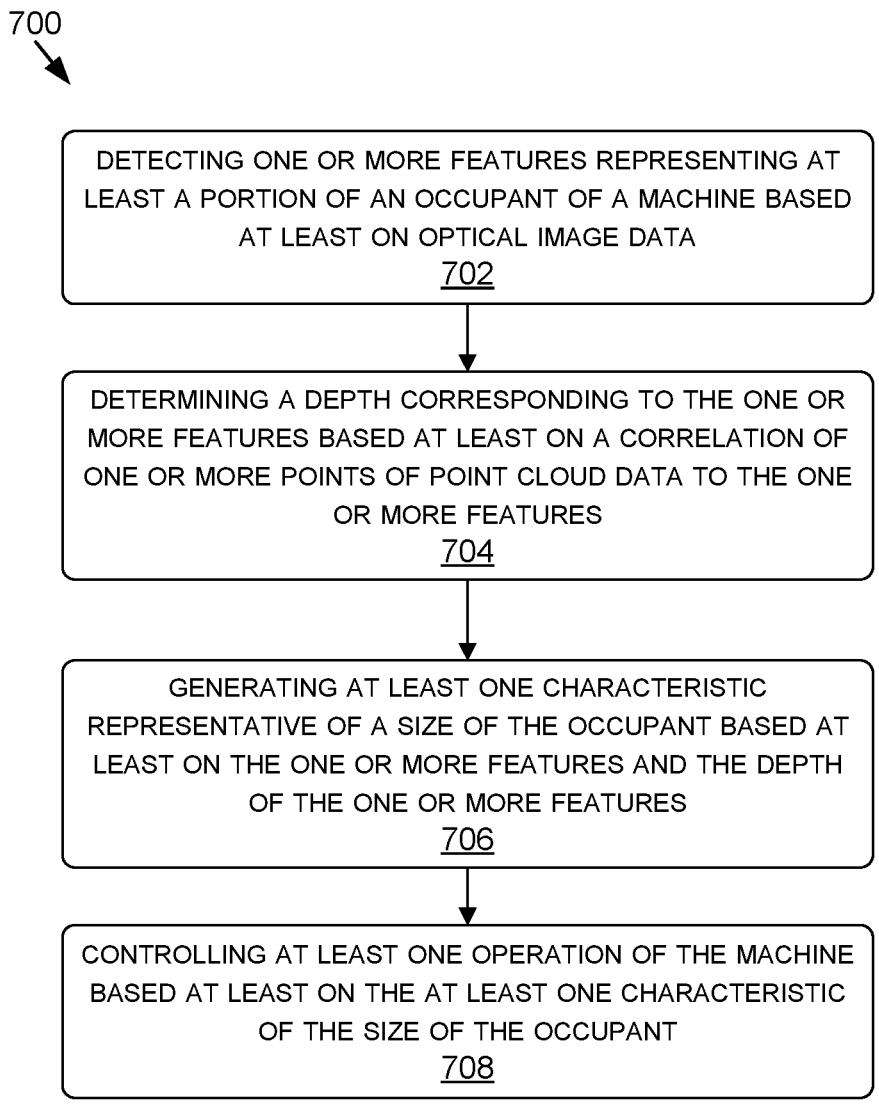
FIG. 7 is a diagram illustrating an example method for image-based three-dimensional occupant assessment, in accordance with some embodiments of the present disclosure.

Now referring to FIG. 7, FIG. 7 is a flow diagram showing a method 700 for image-based three-dimensional occupant assessment system, in accordance with some embodiments of the present disclosure. It should be understood that the features and elements described herein with respect to the method 700 of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa.

Each block of method 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 700 is described, by way of example, with respect to the image-based three-dimensional occupant assessment systems of any of the figures illustrated herein. However, these methods may additionally or alternatively be executed by any one system, or any combination of systems, including, but not limited to, those described herein.

The method 700, in some embodiments, may be drawn to generating at least one characteristic representative of a size of an occupant of a vehicle based at least on one or more features representing at least a portion of the occupant derived from two-dimensional optical image data and a depth of the one or more features derived from one or more points of point cloud depth data, where the optical image data and the point cloud depth data are mapped to a common reference coordinate frame, and controlling at least one operation of the vehicle based at least on the at least one characteristic of the size of the occupant.

The method 700, at block B702, includes detecting one or more features representing at least a portion of an occupant of a machine based at least on optical image data. In some embodiments, detecting the one or more features may include executing at least one three-dimensional pose detection model (e.g., the 3D pose detection model 222) to generate a scale-normalized three-dimensional pose estimate of the vehicle occupant based at least on the one or more features. For example, an occupant evaluation function may (e.g., the occupant evaluation function 110) may apply the optical image data to at least one person detection model to define the portion of an image frame representing the occupant, and generate a scale-normalized three-dimensional pose estimate based at least on the portion of the image frame representing the occupant. In some embodiments, detecting one or more features may include generating a scale-normalized three-dimensional pose estimate of the occupant based at least on the detected one or more features. The scale-normalized three-dimensional pose estimate may represent a set of kinematic elements for the vehicle occupant. In some embodiments, detecting the one or more features may include executing segmentation model (e.g., the segmentation model 610) and/or producing an occupant mask (e.g., occupant mask 620) of features of the vehicle occupant. In such embodiments, detecting the feature(s) may include generating the occupant mask based at least on a segmentation of the optical image data. The occupant mask may comprise a boundary that outlines pixels corresponding to the feature(s) of the occupant.

The method 700, at block B704, includes determining a depth corresponding to the one or more features based at least on a correlation of one or more points of point cloud depth data to the one or more features. Determining the depth may include performing particle transport simulation (e.g., ray tracing, such as illustrated in FIG. 3) to correlate at least a first point of the point cloud depth data (e.g., calibrated point cloud depth data 113) to the one or more features to determine the depth corresponding to the one or more features. In some embodiments, the method may include applying at least one calibration transform (e.g., calibration transform 109) to generate a representation of the optical image data and the point cloud depth data mapped to a common reference coordinate frame. The depth corresponding to the one or more features may be determined based at least on the representation of the optical image data and the point cloud depth data mapped to the common reference coordinate frame. In some embodiments the scale-normalized three-dimensional pose 224 estimate of the occupant may be generated based at least on the one or more features, with the scale-normalized three-dimensional pose estimate representing a set of kinematic elements of the occupant that includes at least a first body joint. The depth corresponding to the one or more features may be determined based at least on a correlation of at least a first point of the point cloud depth data to the first body joint. In some embodiments, and image frame of the optical image data may be segmented based at least on the optical image data to generate a mask corresponding to a bounded outline of the occupant; and a point cloud derived occupant size estimate determined for the occupant based at least on applying the point cloud depth data and the mask corresponding to the bounded outline of the occupant to at least one size estimation model.

The method 700, at block B706, includes generating at least one characteristic representative of a size of the occupant based at least on the one or more features and the depth of the one or more features. As discussed herein, the at least one characteristic representative of a size of the occupant may comprise, for example, a three-dimensional size estimate, a three-dimensional pose estimate, or other characteristic that reflects a size of the vehicle occupant. In some embodiments, the characteristic representative of the size of the occupant may be determined based at least on a linear measurement scale three-dimensional pose estimate (e.g., an absolute 3D pose estimate). In some embodiments, the scale-normalized three-dimensional pose estimate may be scaled to a linear measurement scale three-dimensional pose estimate based at least on the depth corresponding to the one or more features, and the at least one characteristic representative of the size of the occupant generated based at least on the linear measurement scale three-dimensional pose estimate. In some embodiments, the scale-normalized three-dimensional pose estimate may be scaled to a linear measurement scale three-dimensional pose estimate based at least on the depth corresponding to the first body joint to determine a distance from the first body joint to the second body joint; and generate the at least one characteristic representative of the size of the occupant based at least on a body limb length based at least on the distance from the first body joint to the second body joint. A point cloud derived occupant size estimate (e.g., illustrated in FIG. 4) for the occupant may be generated based at least on application of the point cloud depth data to at least one size estimation model. A confidence value may be determined corresponding to a predicted accuracy of the at least one characteristic representative of the size of the occupant. Based at least on the confidence value, a size estimate for the occupant may be selectively output comprising either the point cloud derived occupant size estimate, the at least one characteristic representative of the size of the occupant, or a size estimate based on a combination of both.

The method 700, at block B708, includes controlling at least one operation of the vehicle based at least on the at least one characteristic of the size of the occupant. For example, based at least in part on the at least one characteristic representative of a size of the occupant, an interior monitoring system 150 may generate one or more output(s) 154. As an example, the interior monitoring system 150 may use 3D occupant representation data 140 (either alone or in combination with other data such as optical image data 107) to predict the presence and/or location of occupants-such as objects, persons, and/or animals-within the interior space of the vehicle 800. Other systems of the vehicle 800 may determine one or more actions to take based on the predictions, and/or control other tasks or operations included in outputs 154. For example, based on output(s) 154, an alarm or warning may be generated, door locks and/or windows may be operated, various functions may be turned on/off, data for a digital assistant, chat bot, digital avatar, and/or the like may be generated, and/or air conditioning or air circulation functions may be operated. In some embodiments, the characteristic representing the size of the occupant from the 3D occupant representation data 140 may be used in conjunction with a child presence detection system to estimate an age of the occupant, and/or control an alert system (e.g., alarm and/or notification systems) based on determining that an occupant under an estimated age threshold may have been inadvertently left alone in the vehicle. In some embodiments the characteristic representing the size of the occupant may be used in conjunction with other vehicle safety features. For example, in some embodiments, airbag deployments, driver monitoring systems, HMI applications, and/or other vehicle functions may be controlled based at least on a 3D pose, 3D shape, and/or 3D size estimate of the vehicle occupant provided by the 3D occupant representation data 140.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation, autonomous or semi-autonomous machine applications, deep learning, environment simulation, object or actor simulation and/or digital twinning, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing generative AI operations using a language model, systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 8A:
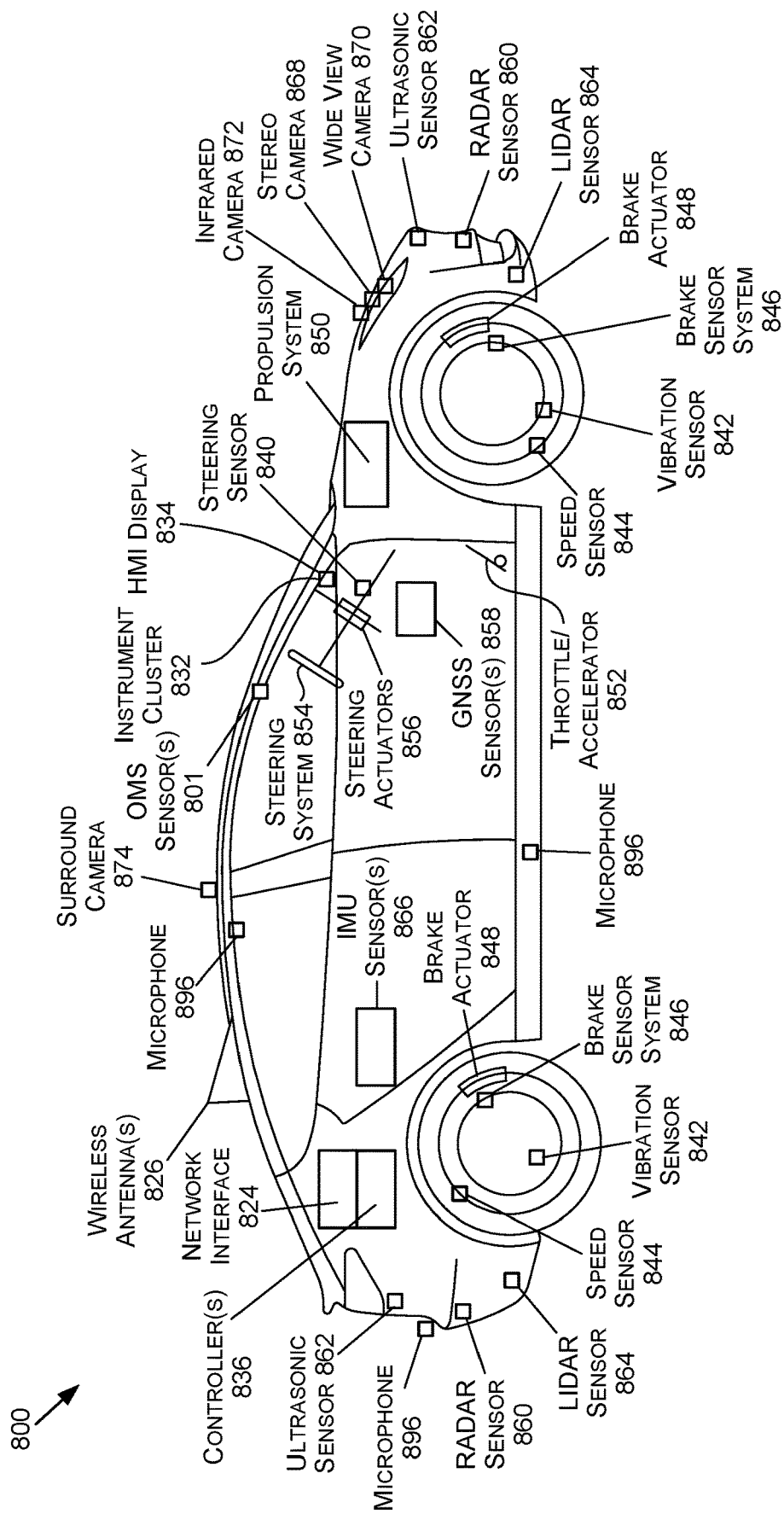
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. In some embodiments, one or more operations executed by the controller(s) 836 may be performed in response to the output(s) 154 generated by the interior monitoring system 150. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), one or more occupant monitoring system (OMS) sensor(s) 801 (e.g., one or more interior cameras), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the High Definition ("HD") map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 826 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 8B:
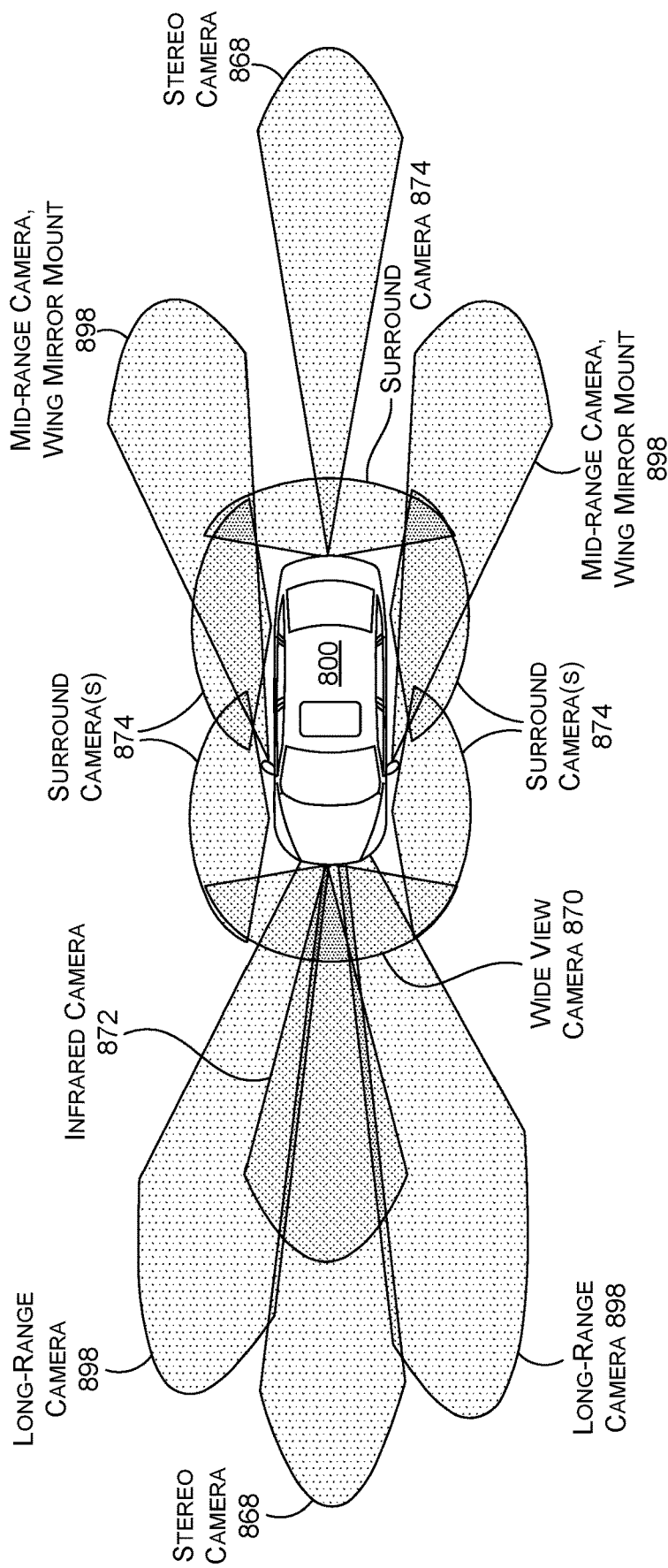
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number (including zero) of wide-view cameras 870 on the vehicle 800. In addition, any number of long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

Any number of stereo cameras 868 may also be included in a front-facing configuration. In at least one embodiment, one or more of stereo camera(s) 868 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360-degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Cameras with a field of view that include portions of the interior environment within the cabin of the vehicle 800 (e.g., one or more OMS sensor(s) 801) may be used as part of an occupant monitoring system (OMS) such as, but not limited to, a driver monitoring system (DMS). For example, OMS sensors (e.g., the OMS sensor(s) 801) may be used (e.g., by the controller(s) 836) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 8C:
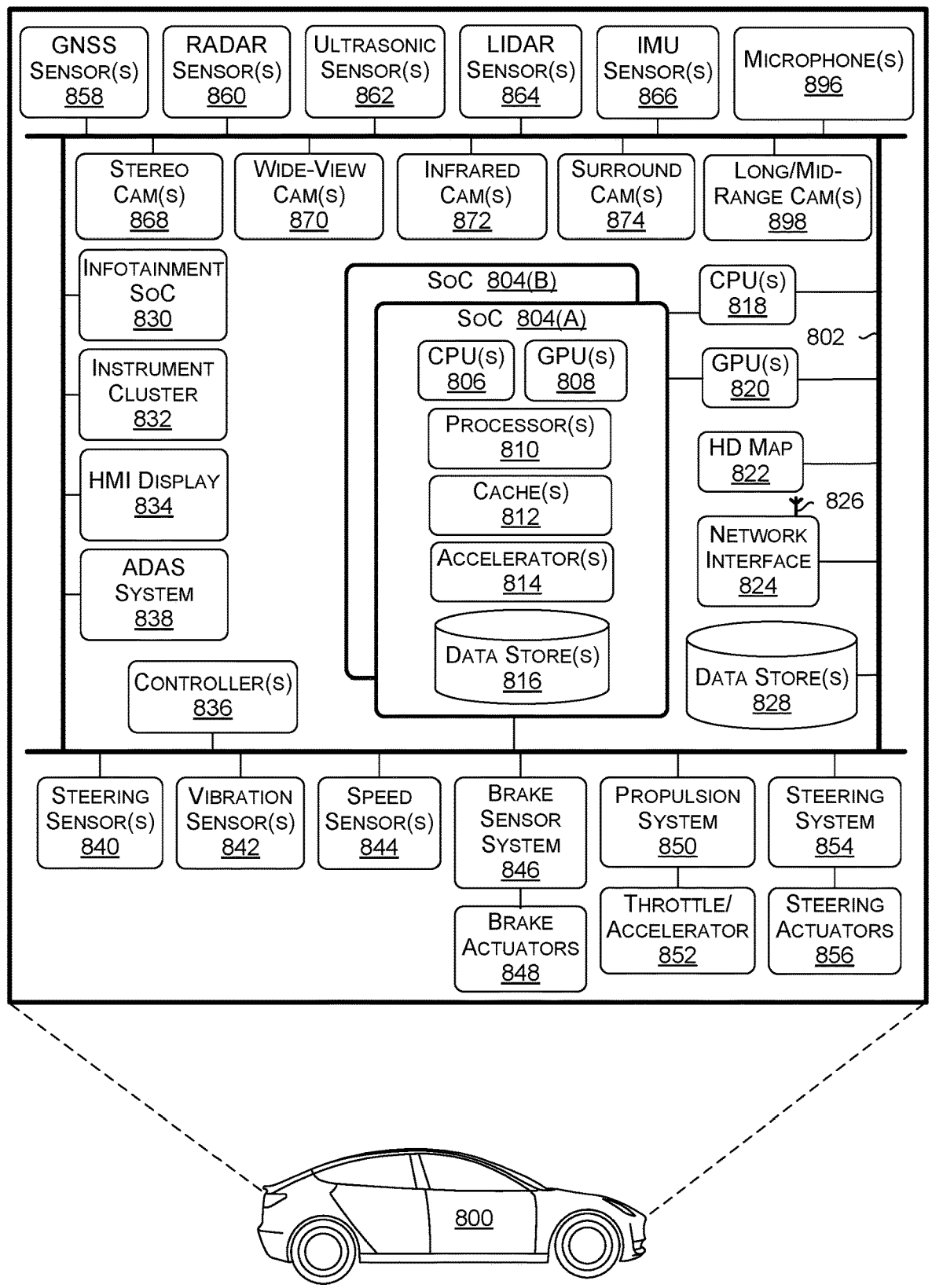
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 804 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection). In some embodiments, one or more of the models disclosed above of the occupant evaluation function 110 may be executed an SoC 804, CPU(s) 806, GPU(s) 808 and/or accelerators 814.

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 816 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
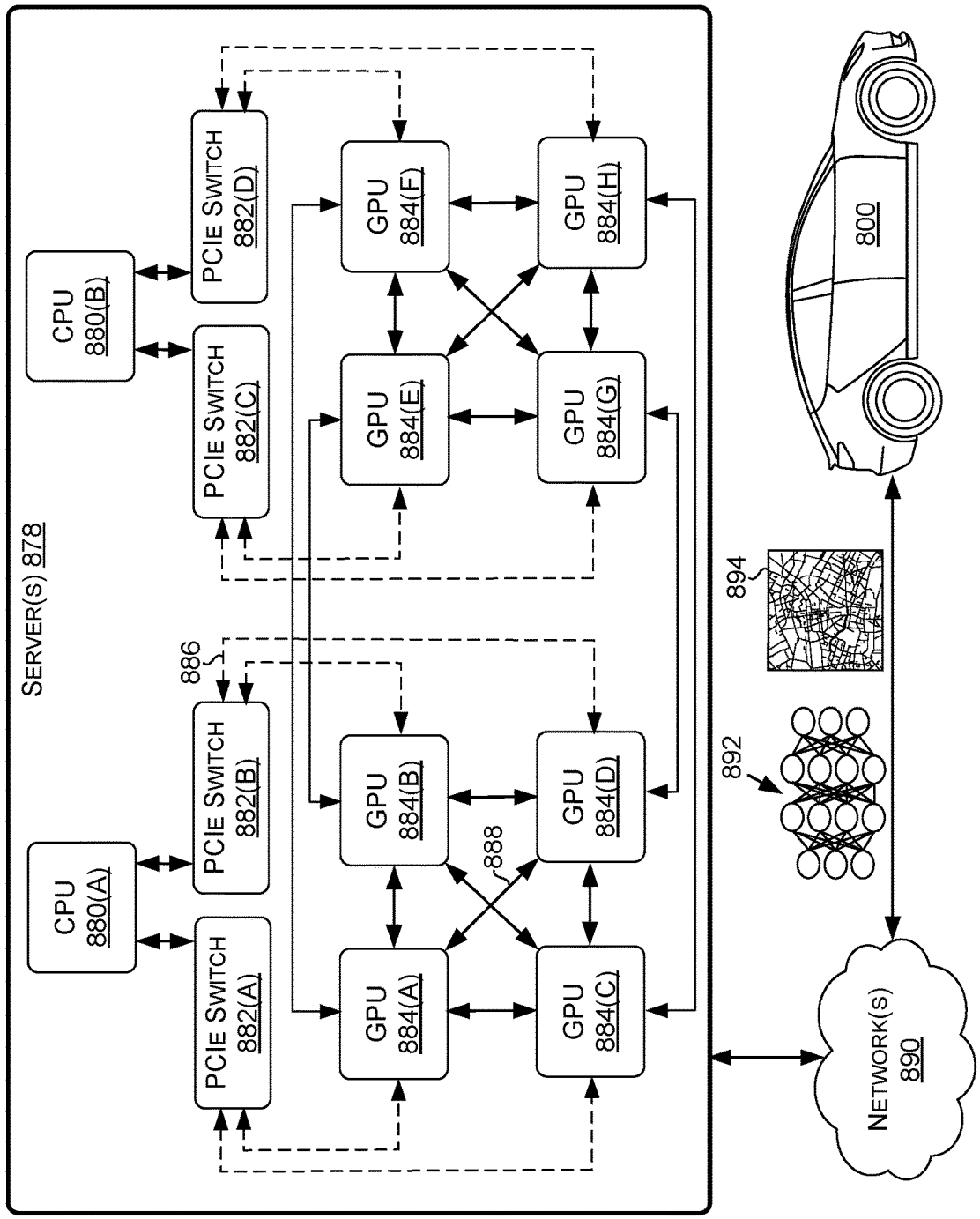
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
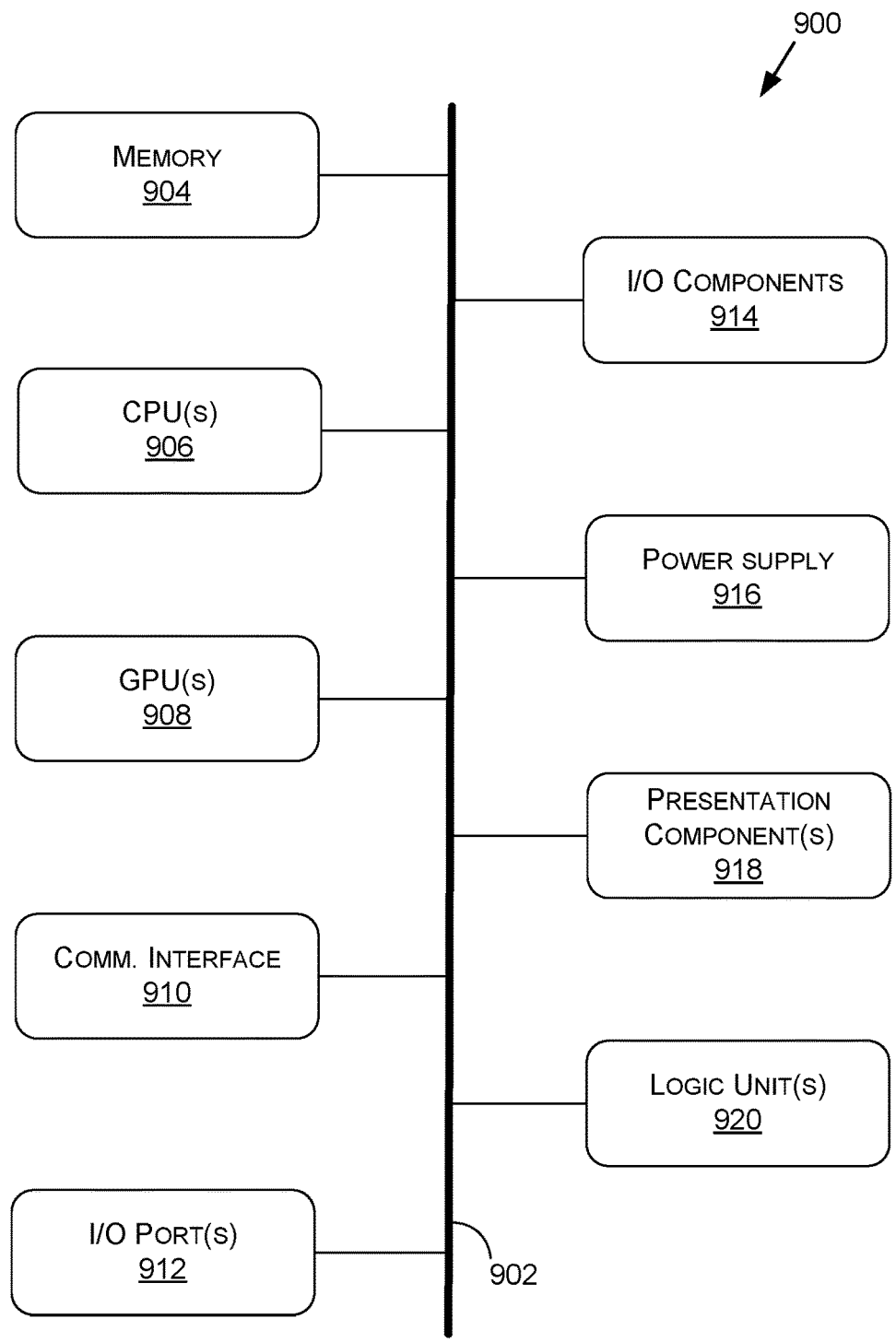
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof. In some embodiments, one or more aspects of the occupant evaluation function 110 may be implemented using code executed on the CPUs 906 and/or GPUs 908.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
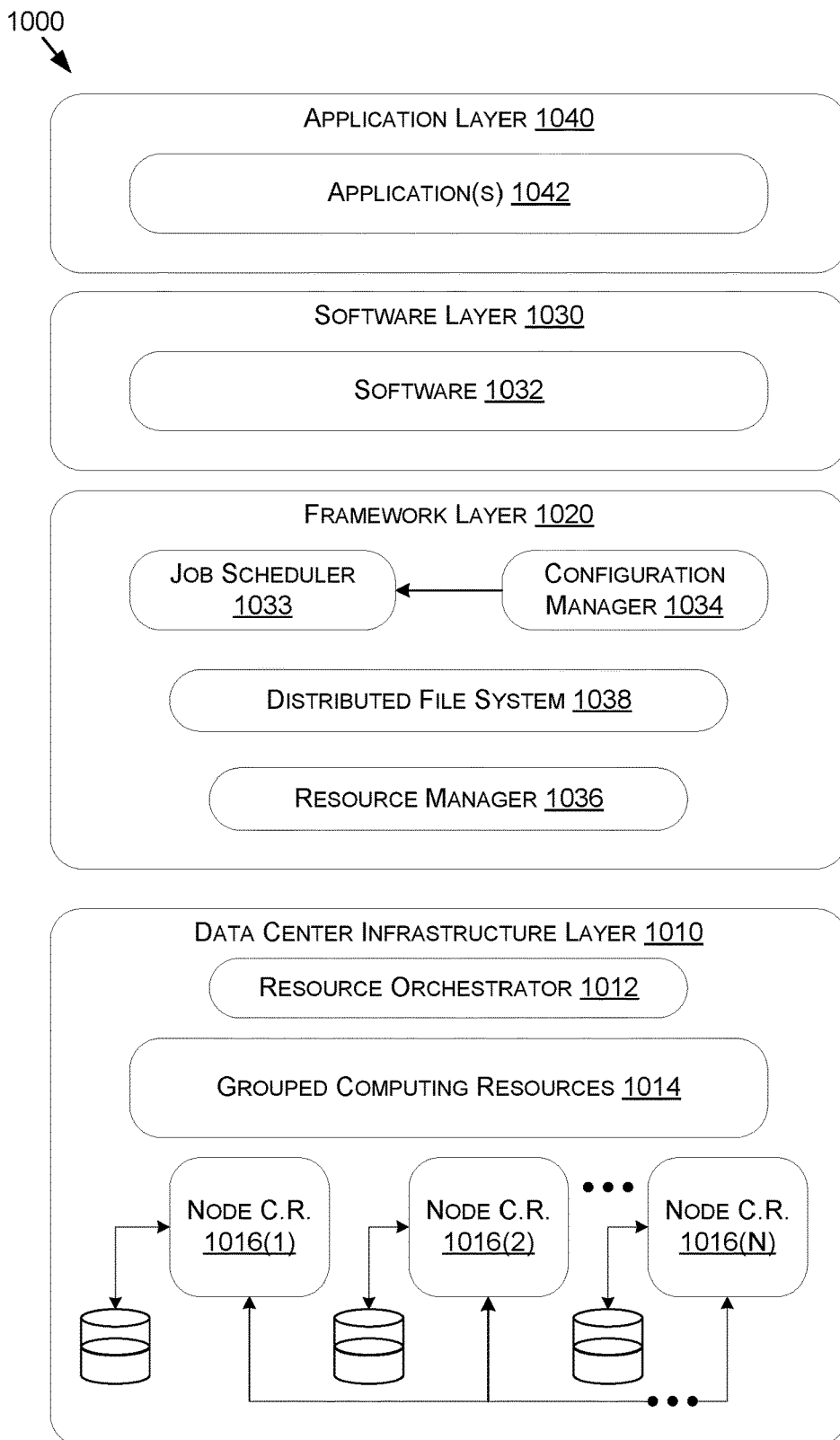
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161 (N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources. In some embodiments, one or more aspects of the occupant evaluation function 110 may be implemented by software 1032 or application(s) 1042.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more processing units to:
generate a first three-dimensional pose estimate of at least a portion of an occupant of a machine based at least on two-dimensional optical image data representative of at least a portion of an interior of the machine;
determine a depth corresponding to one or more kinematic elements of the occupant based at least on a correlation of one or more points of point cloud depth data to the first three-dimensional pose estimate;
scale the first three-dimensional pose estimate to a second three-dimensional pose element based at least on the depth corresponding to the one or more kinematic elements of the occupant to determine at least one characteristic representative of a size of the occupant; and
control at least one operation of the machine based at least on the at least one characteristic of the size of the occupant.

2. The processor of claim 1, wherein the one or more processing units are further to:
apply the optical image data to at least one person detection model to define the portion of an image frame representing the occupant; and
generate the first three-dimensional pose estimate based at least on the portion of the image frame representing the occupant.

3. The processor of claim 1, wherein the one or more processing units are further to:
perform a particle transport simulation to correlate at least a first point of the one or more points of point cloud depth data to the one or more kinematic elements to determine the depth corresponding to the one or more kinematic elements.

4. The processor of claim 1, wherein the one or more processing units are further to:
apply at least one calibration transform to generate a representation of the optical image data and the one or more points of point cloud depth data mapped to a common reference coordinate frame; and
determine the depth corresponding to the one or more kinematic elements based at least on the representation of the optical image data and the one or more points of point cloud depth data mapped to the common reference coordinate frame.

5. The processor of claim 1, wherein the one or more processing units are further to:
generate an occupant size estimate for the occupant based at least on application of the one or more points of point cloud depth data to at least one size estimation model.

6. The processor of claim 5, wherein the one or more processing units are further to:
selectively output a size estimate for the occupant based on at least one of the occupant size estimate or the at least one characteristic representative of the size of the occupant.

7. The processor of claim 1, wherein the processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for three-dimensional assets;
a system for generating or presenting at least one of virtual reality content, augmented reality content, or mixed reality content;
a system for performing deep learning operations;
a system for performing real-time streaming;
a system implemented using an edge device;
a system implemented using a robot;
a system for performing conversational AI operations;
a system for performing operations using one or more language models;
a system for generating synthetic data;
a system incorporating one or more virtual machines (VMs);
a system implemented at least partially in a data center;
a system for performing generative AI operations;
a system implemented at least partially using a language model; or
a system implemented at least partially using cloud computing resources.

8. A method comprising:
generating a first three-dimensional pose estimate of at least a portion of an occupant of a machine based at least on two-dimensional optical image data representative of at least a portion of an interior of the machine;
determining a depth corresponding to one or more kinematic elements of the occupant based at least on a correlation of one or more points of point cloud depth data to the first three-dimensional pose estimate;
scaling the first three-dimensional pose estimate to a second three-dimensional pose element based at least on the depth corresponding to the one or more kinematic elements of the occupant to determine at least one characteristic representative of a size of the occupant; and
controlling at least one operation of the machine based at least on the at least one characteristic of the size of the occupant.

9. The method of claim 8, further comprising:
applying the optical image data to at least one person detection model to define the portion of an image frame representing the occupant; and
generating the first three-dimensional pose estimate based at least on the portion of the image frame representing the occupant.

10. The method of claim 8, further comprising:
performing a particle transport simulation to correlate at least a first point of the one or more points of point cloud depth data to the one or more kinematic elements to determine the depth corresponding to the one or more kinematic elements.

11. The method of claim 8, further comprising:
applying at least one calibration transform to generate a representation of the optical image data and the one or more points of point cloud depth data mapped to a common reference coordinate frame; and
determining the depth corresponding to the one or more kinematic elements based at least on the representation of the optical image data and the one or more points of point cloud depth data mapped to the common reference coordinate frame.

12. The method of claim 8, further comprising:
generating an occupant size estimate for the occupant based at least on application of the one or more points of point cloud depth data to at least one size estimation model.

13. The method of claim 12, further comprising:
selectively outputting a size estimate for the occupant based on at least one of the occupant size estimate or the at least one characteristic representative of the size of the occupant.

14. The method of claim 8, wherein the method is performed by at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for three-dimensional assets;
a system for generating or presenting at least one of virtual reality content, augmented reality content, or mixed reality content;
a system for performing deep learning operations;
a system for performing real-time streaming;
a system implemented using an edge device;
a system implemented using a robot;
a system for performing conversational AI operations;
a system for performing operations using one or more language models;
a system for generating synthetic data;
a system incorporating one or more virtual machines (VMs);
a system implemented at least partially in a data center;
a system for performing generative AI operations;
a system implemented at least partially using a language model; or
a system implemented at least partially using cloud computing resources.

* * * * *